US012637538B2

(12) United States Patent
Kriley et al.

(10) Patent No.: US 12,637,538 B2
(45) Date of Patent: May 26, 2026

(54) COATING COMPOSITIONS

(71) Applicant: PPG Industries Ohio, Inc., Cleveland, OH (US)

(72) Inventors: Joseph P. Kriley, Valencia, PA (US); Marvin M. Pollum, Jr., Pittsburgh, PA (US); David J. Fortman, Pittsburgh, PA (US); Brian K. Rearick, Allison Park, PA (US); Masayuki Nakajima, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 452 days.

(21) Appl. No.: 17/753,180

(22) PCT Filed: Jun. 23, 2020

(86) PCT No.: PCT/US2020/039130

§ 371 (c)(1),
(2) Date: Feb. 23, 2022

(87) PCT Pub. No.: WO2021/040867

PCT Pub. Date: Mar. 4, 2021

(65) Prior Publication Data

US 2022/0275148 A1 Sep. 1, 2022

Related U.S. Application Data

(60) Provisional application No. 62/890,675, filed on Aug. 23, 2019.

(51) Int. Cl.

| | |
|---|---|
| ***C09D 7/65*** | (2018.01) |
| ***B33Y 80/00*** | (2015.01) |
| ***C04B 37/02*** | (2006.01) |
| ***C08G 59/18*** | (2006.01) |
| ***C08G 59/24*** | (2006.01) |
| ***C08G 59/40*** | (2006.01) |
| ***C08G 59/50*** | (2006.01) |
| ***C08G 59/64*** | (2006.01) |
| ***C08K 5/17*** | (2006.01) |
| ***C08K 5/31*** | (2006.01) |
| ***C09D 7/40*** | (2018.01) |
| ***C09D 7/63*** | (2018.01) |
| ***C09D 163/00*** | (2006.01) |
| ***C09J 11/06*** | (2006.01) |
| ***C09J 11/08*** | (2006.01) |
| ***C09J 163/00*** | (2006.01) |

(52) U.S. Cl.

CPC ........ *C08G 59/5033* (2013.01); *C04B 37/028* (2013.01); *C08G 59/184* (2013.01); *C08G 59/245* (2013.01); *C08G 59/4021* (2013.01); *C08G 59/50* (2013.01); *C08G 59/5026* (2013.01); *C08G 59/64* (2013.01); *C08K 5/17* (2013.01); *C08K 5/31* (2013.01); *C09D 7/63* (2018.01); *C09D 7/65* (2018.01); *C09D 7/70* (2018.01); *C09D 163/00* (2013.01); *C09J 11/06* (2013.01); *C09J 11/08* (2013.01); *C09J 163/00* (2013.01); *B33Y 80/00* (2014.12); *C04B 2237/02* (2013.01); *C04B 2237/402* (2013.01); *C08L 2207/53* (2013.01)

(58) Field of Classification Search

CPC .. C08G 59/5033; C08G 59/245; C08G 59/50; C08G 59/5026; C08G 59/184; C08G 59/4021; C08G 59/64; C04B 37/028; C04B 2237/02; C04B 2237/402; C09D 7/65; C09D 163/00; C09D 7/70; C09D 7/63; C09J 11/08; C09J 163/00; C09J 11/06; B33Y 80/00; C08L 2207/53; C08K 5/17; C08K 5/31

See application file for complete search history.

(56) References Cited

U.S. PATENT DOCUMENTS

| | | |
|---|---|---|
| 4,122,069 A | 10/1978 | Meyer |
| 4,476,285 A | 10/1984 | Crabtree et al. |

(Continued)

FOREIGN PATENT DOCUMENTS

| | | |
|---|---|---|
| CA | 2100016 A1 | 1/1994 |
| CA | 2191419 A1 | 5/1997 |

(Continued)

OTHER PUBLICATIONS

International Search Report and Written Opinion received for PCT Application Serial No. PCT/US2020/039130 dated Feb. 5, 2021, 8 pages.

International Search Report and Written Opinion received for PCT Application Serial No. PCT/US2020/039142 dated Nov. 9, 2020, 11 pages.

"Polyamines containing β-hydroxyurethane linkages as curing agents for epoxy resin", Rokicki, Gabriel et al., Angewandte Makromolekulare Chemie 1989.

"CO2 derived hydrogen bonding spacer: enhanced toughness, transparency, elongation and non-covalent interactions in epoxy-hydroxyurethane networks", Anitha, S. et al., Journal of Materials Chemistry A: Materials for Energy and Sustainability 2017.

(Continued)

*Primary Examiner* — Rabon A Sergent

(57) ABSTRACT

Disclosed is an epoxide-functional adduct (E2) and an amine-functional adduct (A3) and coating compositions including these adducts. The epoxide-functional adduct (E2) comprises a reaction product of a reaction mixture comprising (a) an epoxy-containing compound (E1) and (b) a diamine comprising a cyclic ring and/or a polyamine comprising a cyclic ring (A1). The amine-functional adduct comprises a reaction product of a reaction mixture comprising the epoxy-functional adduct (E2) and a monoamine, diamine, and/or polyamine (A2), wherein the monoamine, diamine, and/or polyamine (A2) are different than the diamine comprising a cyclic ring and/or the polyamine comprising a cyclic ring (A1). The present invention is also directed to methods of making the compositions, methods of coating a substrate, and coated substrates.

11 Claims, No Drawings

(56) References Cited

U.S. PATENT DOCUMENTS

| | | | | |
|---|---|---|---|---|
| 4,540,750 | A | 9/1985 | Ham | |
| 4,793,867 | A | 12/1988 | Charles et al. | |
| 5,247,158 | A | 9/1993 | Steinhauser et al. | |
| 5,489,630 | A * | 2/1996 | Walker | C08G 59/184 523/404 |
| 5,588,989 | A | 12/1996 | Vonk et al. | |
| 5,597,876 | A | 1/1997 | Murata et al. | |
| 5,677,006 | A | 10/1997 | Hoenel et al. | |
| 5,874,624 | A | 2/1999 | Horiguchi et al. | |
| 6,180,693 | B1 | 1/2001 | Tang et al. | |
| 6,288,208 | B1 * | 9/2001 | Moshinsky | C08G 83/003 525/422 |
| 6,312,812 | B1 | 11/2001 | Hauser et al. | |
| 6,432,485 | B1 | 8/2002 | Beyers et al. | |
| 7,737,199 | B2 | 6/2010 | Barker | |
| 7,749,368 | B2 | 7/2010 | McMurdie et al. | |
| 8,263,687 | B2 | 9/2012 | Muller-Frischinger et al. | |
| 8,673,091 | B2 | 3/2014 | McMillen et al. | |
| 8,759,464 | B2 | 6/2014 | Horgan et al. | |
| 8,796,361 | B2 | 8/2014 | Asay et al. | |
| 9,562,175 | B2 | 2/2017 | Asay et al. | |
| 9,567,480 | B2 | 2/2017 | Vogel et al. | |
| 2002/0183450 | A1 | 12/2002 | Smith | |
| 2003/0205299 | A1 | 11/2003 | Greene et al. | |
| 2003/0230364 | A1 | 12/2003 | Greene et al. | |
| 2004/0079647 | A1 | 4/2004 | Warburton et al. | |
| 2007/0207284 | A1 * | 9/2007 | McClintic | E01F 13/12 428/354 |
| 2009/0226729 | A1 | 9/2009 | Niimoto et al. | |
| 2009/0239093 | A1 | 9/2009 | Inbe et al. | |
| 2012/0129980 | A1 | 5/2012 | Desai et al. | |
| 2012/0210758 | A1 | 8/2012 | Dolev et al. | |
| 2013/0217806 | A1 | 8/2013 | Gehringer et al. | |
| 2013/0244026 | A1 | 9/2013 | Inbe et al. | |
| 2015/0082747 | A1 | 3/2015 | Honda et al. | |
| 2015/0240111 | A1 | 8/2015 | Vogel et al. | |
| 2016/0083501 | A1 | 3/2016 | Grun et al. | |
| 2016/0159833 | A1 | 6/2016 | Kramer et al. | |
| 2017/0015883 | A1 | 1/2017 | Lammerschop et al. | |
| 2017/0107318 | A1 | 4/2017 | Nakajima et al. | |
| 2017/0158806 | A1 * | 6/2017 | Peters | C07D 303/27 |

FOREIGN PATENT DOCUMENTS

| | | | |
|---|---|---|---|
| CN | 1330676 | A | 1/2002 |
| CN | 101014639 | A | 8/2007 |
| CN | 101880376 | A | 11/2010 |
| CN | 102453458 | A | 5/2012 |
| CN | 102838960 | A | 12/2012 |
| CN | 102875057 | A | 1/2013 |
| CN | 103270128 | A | 8/2013 |
| CN | 103408726 | A | 11/2013 |
| CN | 104559064 | A | 4/2015 |
| CN | 104817992 | A | 8/2015 |
| EP | 0253339 | A2 | 1/1988 |
| EP | 1070733 | A1 | 1/2001 |
| EP | 1070748 | A1 | 1/2001 |
| EP | 1788048 | A1 | 5/2007 |
| EP | 1997934 | A1 | 12/2008 |
| EP | 3118240 | A1 | 1/2017 |
| JP | 57-202318 | A | 12/1982 |
| JP | 06-299133 | A | 10/1994 |
| JP | 2003-020379 | A | 1/2003 |
| JP | 2004-269680 | A | 9/2004 |
| JP | 2008-001789 | A | 1/2008 |
| JP | 2011-012144 | A | 1/2011 |
| JP | 2015-093941 | A | 5/2015 |
| JP | 2017-124629 | A | 7/2017 |
| JP | 2017-222760 | A | 12/2017 |
| KR | 20010086434 | A | 9/2001 |
| KR | 10-2005-0006211 | A | 1/2005 |
| KR | 10-2014-0101838 | A | 8/2014 |
| KR | 10-2015-0079622 | A | 7/2015 |
| KR | 10-2017-0033942 | A | 3/2017 |
| WO | 2000022030 | A1 | 4/2000 |
| WO | 03/93532 | A2 | 11/2003 |
| WO | 2008/016889 | A1 | 2/2008 |
| WO | 2011/157671 | A1 | 12/2011 |
| WO | 2013/060950 | A1 | 5/2013 |
| WO | 2014/150020 | A1 | 9/2014 |
| WO | 2014/158705 | A1 | 10/2014 |
| WO | 2015/102911 | A1 | 7/2015 |
| WO | 2015/150543 | A1 | 10/2015 |
| WO | 2015175583 | A1 | 11/2015 |
| WO | 2015/191326 | A1 | 12/2015 |
| WO | 2016/084960 | A1 | 6/2016 |
| WO | 2016176568 | A1 | 11/2016 |
| WO | 2016/208618 | A1 | 12/2016 |
| WO | 2019/004459 | A1 | 1/2019 |
| WO | 2020/167758 | A1 | 8/2020 |
| WO | 2021040867 | A1 | 3/2021 |

OTHER PUBLICATIONS

"Development of epoxy-urethane hybrid coatings via non-isocyanate route", Wazarkar, Kunal et al., European Polymer Journal 2016.

"Epoxy coatings plasticized by cyclic carbonates", Kutsenok, B. I. et al., Lakokrasochnye Materialy i Ikh Primenenie 1983. (English language Abstract).

"Hybrid non-isocyanate polyurethane adhesives and sealing agents", Biryukova, 0. V. et al., Klei, Germetiki, Tekhnologii 2005. (English language Abstract).

"Polyamines containing B-hydroxyurethane linkages as curing agents for epoxy resin", Rokicki, Gabriel et al., Angewandte Makromolekulare Chemie 1989.

Jensen, Robert E., et al., "Single-Lap-Joint Screening of Hysol EA 9309NA Epoxy Adhesive", ARL-TR-8011, ARL, US Army Research Laboratory, May 2017, 32 pages.

* cited by examiner

COATING COMPOSITIONS

CROSS-REFERENCE

This application claims the benefit of U.S. Provisional Patent Application Ser. No. 62/890,675, filed Aug. 23, 2019, the entire contents of which is incorporated herein by reference.

GOVERNMENT CONTRACT

This invention was made with Government support under Government Contract No. 201867-140932 entitled Consolidation of Adhesives and Sealants Phase II FY17 awarded by the CCDC Ground Vehicle Systems Center. The United States Government has certain rights in this invention.

FIELD OF THE INVENTION

The present invention relates to compositions, for example sealant, adhesive, and coating compositions, and to sealants, adhesives, and coatings.

BACKGROUND OF THE INVENTION

Coating compositions, including sealants and adhesives, are utilized in a wide variety of applications to treat a variety of substrates or to bond together two or more substrate materials.

SUMMARY OF THE INVENTION

Disclosed are epoxide-functional adducts (E2) comprising a first reaction product of a reaction mixture comprising (a) an epoxy-containing compound (E1) and (b) a diamine comprising a cyclic ring and/or a polyamine comprising a cyclic ring (A1).

Also disclosed are amine-functional adducts (A3) comprising a second reaction product of a reaction mixture comprising the epoxy-functional adduct (E2) of the present invention and a monoamine, diamine, and/or polyamine (A2), wherein the monoamine, diamine, and/or polyamine (A2) are different than the diamine comprising a cyclic ring and/or the polyamine comprising a cyclic ring (A1).

Also disclosed are coating compositions, comprising: a first component comprising an epoxy-containing compound (E1); and a second component that chemically reacts with the epoxy-containing compound (E1), the second component comprising one of the amine-functional adducts (A3) of the present invention.

Also disclosed are coating compositions, comprising: a first component comprising one of the epoxide-functional adducts (E2) of the present invention; and a second component that chemically reacts with the epoxide-functional adduct (E2), the second component comprising a monoamine, diamine, and/or polyamine (A2) and/or one of the amine-functional adducts (A3) of the present invention, wherein the monoamine, diamine, and/or polyamine (A2) is different than the diamine comprising a cyclic ring and/or a polyamine comprising a cyclic ring (A1).

Also disclosed herein is an adhesive having a lap shear displacement of at least 2.5 mm at failure and a lap shear strength of at least 30.0 MPa, wherein the lap shear displacement and the lap shear strength are measured according to ASTM D1002-10 using 2024-T3 aluminum substrate of 1.6 mm thickness, as measured by an INSTRON 5567 machine in tensile mode with a pull rate of 1.3 mm per minute.

Also disclosed herein are substrates comprising a surface, at least a portion of which is coated with or embedded in one of the compositions disclosed herein.

Also disclosed herein are parts comprising a surface, at least a portion of which is coated with or embedded in one of the compositions disclosed herein.

Also disclosed herein are methods for forming a coating on a surface of a substrate comprising: mixing the first component and the second component of any of compositions disclosed herein; and applying the composition to the surface of the first substrate, wherein at least a portion of the substrate is coated with the composition following the application.

Also disclosed herein are methods of forming an article comprising extruding the compositions of the present invention.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "an" epoxy and "a" curing agent, a combination (i.e., a plurality) of these components can be used.

In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, a coating composition "applied onto" a substrate does not preclude the presence of one or more other intervening coating layers of the same or different composition located between the coating composition and the substrate.

As used herein, "monoamine" refers to an organic compound having one amino functional group.

As used herein, "diamine" refers to an organic compound having two amino functional groups.

As used herein, "polyamine" refers to an organic compound having more than two amino functional groups.

As used herein, "amino functional group" refers to a functional group comprising a nitrogen atom attached by a single bond to a hydrogen atom(s), an alkyl group(s), and/or an aryl group(s).

As used herein, "epoxide functional group" refers to a functional group comprising a cyclic ether with a three-atom ring.

As used herein, "amine hydrogen" refers to the number of active hydrogens directly bonded to the nitrogen atom of an amine- or other nitrogen-containing functional group. "Active hydrogens" refer to hydrogens that can be displaced when the amine- or nitrogen-containing functional group reacts as a nucleophile with an appropriate electrophile and can be determined, for example, by the Zerewitinoff test. Active hydrogens on all accelerators and curing agents (e.g., dicyandiamide and diamines and/or polyamines) were included in the amine hydrogens of the adducts and compositions of the present invention.

As used herein, the term "epoxide-functional adduct" or "E2" refers to a reaction product comprising the residue of an epoxy-containing compound (E1) and a diamine comprising a cyclic ring and/or a polyamine comprising a cyclic ring (A1), wherein the epoxide functionality of E1 is in molar excess relative to the amine hydrogen functionality of A1.

As used herein, the term "amine-functional adduct" or "A3" refers to a reaction product comprising the residue of an epoxide-functional adduct (E2) and a monoamine, a diamine, and/or a polyamine (A2) wherein the diamine and/or polyamine is different from a diamine comprising a cyclic ring and/or a polyamine comprising a cyclic ring (A1), wherein the amine hydrogen functionality of A2 is in molar excess relative to the epoxide functionality of E2.

As used herein, a "coating composition" refers to a composition, e.g., a solution, mixture, or a dispersion, that, in an at least partially dried or cured state, is capable of producing a film, layer, or the like on at least a portion of a substrate surface.

As used herein, a "seal" or a "sealant" or compositions thereof refers to a coating composition, e.g., a solution, mixture, or a dispersion, that, in an at least partially dried or cured state, has the ability to resist atmospheric conditions and particulate matter, such as moisture and temperature and at least partially block the transmission of materials, such as particulates, water, fuel, or other liquids and gasses.

As used herein, the term "structural adhesive" means an adhesive producing a load-bearing joint having both a lap shear strength of at least 20.0 MPa, measured according to ASTM D1002-10 using 2024-T3 aluminum substrate of 1.6 mm thickness, as measured by an INSTRON 5567 machine in tensile mode with a pull rate of 1.3 mm per minute.

As defined herein, a "2K" or "two-component" coating composition refers to a composition in which at least a portion of the reactive components readily react and at least partially cure when mixed without activation from an external energy source, such as at ambient conditions. One of skill in the art understands that the two components of the coating composition are stored separately from each other and mixed just prior to application of the coating composition. As described in more detail below, the 2K coating compositions disclosed herein may be subjected to a curing process wherein (1) at least a portion of the first component and the second component chemically react when mixed at ambient conditions to at least partially cure the coating composition without activation from an external energy source, optionally followed by (2) the application of an external energy source to the coating composition to further cure the coating composition, such as a two-step curing process described herein. External energy sources that may be used to promote the curing reaction (i.e., the crosslinking of the epoxy component and the curing agent) include, for example, radiation (i.e., actinic radiation) and/or heat, such as by baking in an oven and/or forced hot air.

As further defined herein, ambient conditions generally refer to room temperature and humidity conditions or temperature and humidity conditions that are typically found in the area in which the coating composition is being applied to a substrate, e.g., at 10° C. to 40° C. and 5% to 80% relative humidity.

As used herein, "Mw" refers to the weight average molecular weight, for example the theoretical value as determined by Gel Permeation Chromatography using Waters 2695 separation module with a Waters 410 differential refractometer (RI detector) and polystyrene standards, tetrahydrofuran (THF) used as the eluent at a flow rate of 1 ml $min^{-1}$, and two PL Gel Mixed C columns used for separation.

As used herein, the term "accelerator" means a substance that increases the rate or decreases the activation energy of a chemical reaction. An accelerator may be either a "catalyst," that is, without itself undergoing any permanent chemical change, or may be reactive, that is, capable of chemical reactions and includes any level of reaction from partial to complete reaction of a reactant.

As used herein, the terms "latent" or "blocked" or "encapsulated", when used with respect to a curing agent or an accelerator, means a molecule or a compound that is activated by an external energy source prior to reacting (i.e., crosslinking) or having a catalytic effect, as the case may be. For example, an accelerator may be in the form of a solid at room temperature and have no catalytic effect until it is heated and melts or dissolves in the composition, or the latent accelerator may be reversibly reacted with a second compound that prevents any catalytic effect until the reversible reaction is reversed by the application of heat and the second compound is removed, freeing the accelerator to catalyze reactions.

As used herein, the term "curing agent" means any reactive material that can be added to a composition to accelerate curing of the composition (e.g., curing of a polymer). The term "reactive" when used with respect to the curing agent means capable of chemical reactions and includes any level of reaction from partial to complete reaction of a reactant.

As used herein, the term "cure", "cured" or similar terms, as used in connection with the composition described herein, means that at least a portion of the components that form the composition are cross-linked to form a coating, film, layer, or bond. Additionally, curing of the composition refers to subjecting said composition to curing conditions (e.g., elevated temperature, lowered activation energy through catalytic activity, etc.) leading to the reaction of the reactive functional groups of the components of the composition, and resulting in the crosslinking of the components of the composition and formation of an at least partially cured or gelled coating. As used herein, the term "at least partially cured" with respect to a coating refers to a coating formed by subjecting the composition to curing conditions such that a chemical reaction of at least a portion of the reactive groups of the components of the composition occurs to form a coating, film, layer, or bond. A coating composition may be considered to be "at least partially cured" if it has a lap shear strength of greater than 0.2 MPa measured according to ASTM D1002-10 by using an INSTRON 5567 machine in tensile mode with a pull rate of 1.3 mm per minute. As discussed in more detail below, the coating composition may also be subjected to a two-step curing process such that a substantially complete cure is attained and wherein further exposure to curing conditions results in no significant further improvement in the coating properties such as, for example, increased lap shear strength.

As used herein, unless indicated otherwise, the term "substantially free" means that a particular material is not purposefully added to a mixture or composition, respectively, and is only present as an impurity in a trace amount of less than 5% by weight based on a total weight of the mixture or composition, respectively. As used herein, unless indicated otherwise, the term "essentially free" means that a particular material is only present in an amount of less than 2% by weight based on a total weight of the mixture or composition, respectively. As used herein, unless indicated otherwise, the term "completely free" means that a mixture or composition, respectively, does not comprise a particular material, i.e., the mixture or composition comprises 0% by weight of such material.

As used herein, the term "glass transition temperature" ("Tg") refers to the temperature at which an amorphous material, such as a glass or a high molecular weight polymer, changes from a brittle vitreous state to a plastic or rubbery state or from a plastic or rubbery state to a brittle vitreous state. Tg values as used herein may be determined, for example, by the Fox Equation.

The present invention also is directed to an epoxide-functional adduct (E2) comprising, or consisting essentially of, or consisting of, a first reaction product of reaction mixture comprising, or consisting essentially of, or consisting of, (a) an epoxy-containing compound (E1) and (b) a diamine comprising a cyclic ring and/or a polyamine comprising a cyclic ring (A1).

The present invention is also directed to an amine-functional adduct (A3) comprising, or consisting essentially of, or consisting of, a second reaction product of a reaction mixture comprising, or consisting essentially of, or consisting of, an epoxy-functional adduct (E2) and an amine (A2), wherein the amine (A2) is different than the diamine comprising a cyclic ring and/or the polyamine comprising a cyclic ring (A1).

The present invention also is directed to a coating composition comprising, or consisting essentially of, or consisting of: a first component comprising, or consisting essentially of, or consisting of, an epoxy-containing compound (E1); and a second component that chemically reacts with the epoxy-containing compound, the second component comprising, or consisting essentially of, or consisting of, an amine-functional adduct (A3).

The present invention also is directed to a coating composition comprising, or consisting essentially of, or consisting of: a first component comprising an epoxide-functional adduct (E2); and a second component that chemically reacts with the epoxide-functional adduct (E2), the second component comprising a monoamine, diamine, or polyamine (A2), wherein the diamine and the polyamine are different than the diamine containing a cyclic ring and/or a polyamine containing a cyclic ring (A1).

The present invention also is directed to a coating composition comprising, or consisting essentially of, or consisting of: a first component comprising an epoxide-functional adduct (E2); and a second component that chemically reacts with the epoxide-functional adduct (E2), the second component comprising an amine-functional adduct (A3).

As discussed above, the first component of the composition may comprise an epoxy-containing compound (E1). Suitable epoxy-containing compounds that may be used include monoepoxides, polyepoxides, or combinations thereof.

Suitable monoepoxides that may be used include glycidol, monoglycidyl ethers of alcohols and phenols, such as phenyl glycidyl ether, n-butyl glycidyl ether, cresyl glycidyl ether, isopropyl glycidyl ether, glycidyl versatate, for example, CARDURA E available from Shell Chemical Co., and glycidyl esters of monocarboxylic acids such as glycidyl neodecanoate, and mixtures of any of the foregoing.

Useful epoxy-containing compounds (E1) that can be used include polyepoxides (having an epoxy functionality greater than 1), epoxy adducts, or combinations thereof. Suitable polyepoxides include polyglycidyl ethers of Bisphenol A, such as Epon® 828 and 1001 epoxy resins, and Bisphenol F polyepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting epoxy components include epoxidized Bisphenol A novolacs, epoxidized phenolic novolacs, epoxidized cresylic novolac, isosorbide diglycidyl ether, triglycidyl p-aminophenol, and triglycidyl p-aminophenol bismaleimide, triglycidyl isocyanurate, tetraglycidyl 4,4'-diaminodiphenylmethane, and tetraglycidyl 4,4'-diaminodiphenylsulphone. The epoxy-containing compound may also comprise a carboxyl-terminated butadiene-acrylonitrile copolymer modified epoxy-containing compound. The epoxy-containing compound may also comprise an epoxy-containing acrylic, such as glycidyl methacrylate.

The epoxy-containing compound (E1) may comprise an epoxy-adduct. The composition may comprise one or more epoxy-adducts. As used herein, the term "epoxy-adduct" refers to a reaction product comprising the residue of an epoxy and at least one other compound that does not include an epoxide functional group. For example, the epoxy-adduct may comprise the reaction product of reactants comprising an epoxy, a polyol, and an anhydride. The term "epoxy-adduct" used with respect to the epoxy-containing compound (E1) is different than the epoxide-functional adduct (E2) described below.

The epoxy used to form the epoxy-adduct may comprise any of the epoxy-containing compounds listed above that may be included in the composition.

The polyol used to form the epoxy-adduct may include diols, triols, tetraols and higher functional polyols. Combinations of such polyols may also be used. The polyols may be based on a polyether chain derived from ethylene glycol, propylene glycol, butylene glycol, hexylene glycol and the like as well as mixtures thereof. The polyol may also be based on a polyester chain derived from ring opening polymerization of caprolactone (referred to as polycaprolactone-based polyols hereinafter). Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof. Polyamines corresponding to polyols may also be used, and in this case, amides instead of carboxylic esters will be formed with the anhydrides.

The polyol may comprise a polycaprolactone-based polyol. The polycaprolactone-based polyols may comprise diols, triols or tetraols terminated with primary hydroxyl groups. Commercially available polycaprolactone-based polyols include those sold under the trade name Capa™ from Perstorp Group, such as, for example, Capa 2054, Capa 2077A, Capa 2085, Capa 2205, Capa 3031, Capa 3050, Capa 3091 and Capa 4101.

The polyol may comprise a polytetrahydrofuran-based polyol. The polytetrahydrofuran-based polyols may comprise diols, triols or tetraols terminated with primary hydroxyl groups. Commercially available polytetrahydrofuran-based polyols include those sold under the trade name Terathane®, such as Terathane® PTMEG 250 and Terathane® PTMEG 650 which are blends of linear diols in which the hydroxyl groups are separated by repeating tetramethylene ether groups, available from Invista. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

The anhydride that may be used to form the epoxy-adduct may comprise any suitable acid anhydride known in the art. For example, the anhydride may comprise hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianhydride (PMDA); 3,3',4,4'-oxydiphthalic dianhydride (ODPA); 3,3',4,4'-benzophenone tetracarboxylic dianhydride (BTDA); and 4,4'-diphthalic (hexafluoroisopropylidene) anhydride (6FDA).

The epoxy-adduct may comprise a diol, a monoanhydride, and a diepoxy compound, wherein the mole ratio of diol, monoanhydride, and diepoxy compounds in the epoxy-adduct may vary from 0.5:0.8:1.0 to 0.5:1.0:6.0.

The epoxy-adduct may comprise a triol, a monoanhydride, and a diepoxy compound, wherein the mole ratio of triol, monoanhydride, and diepoxy compounds in the epoxy-adduct may vary from 0.5:0.8:1.0 to 0.5:1.0:6.0.

The epoxy-adduct may comprise a tetraol, a monoanhydride, and a diepoxy compound, wherein the mole ratio of tetraol, monoanhydride, and diepoxy compounds in the epoxy-adduct may vary from 0.5:0.8:1.0 to 0.5:1.0:6.0.

Other suitable epoxy-containing compounds (E1) include epoxy-adducts such as epoxy polyesters formed as the reaction product of reactants comprising an epoxy-containing compound, a polyol and an anhydride, as described in U.S. Pat. No. 8,796,361, col. 3, line 42 through col. 4, line 65, the cited portion of which is incorporated herein by reference.

Alternatively, the first component of the compositions disclosed herein also may comprise an epoxide-functional adduct (E2).

Epoxy-containing compounds (E1) useful in forming epoxide-functional adduct (E2) include any of the epoxy-containing compounds described above. Diamines and/or polyamines comprising a cyclic ring (A1) useful in forming the epoxide-functional adduct (E2) include any of those described below.

The diamine and/or polyamine comprising a cyclic ring (A1) may be used in the reaction mixture generating the epoxide-functional adduct (E2) in an amount sufficient to provide a molar ratio of epoxide functional groups from the epoxy-containing compound (E1) to amine-hydrogens from the diamine and/or polyamine (A1) of at least 2:1, such as at least 3:1, such as at least 4:1, such as at least 5:1, such as at least 6:1, and may be present in the epoxide-functional adduct (E2) in an amount sufficient to provide a molar ratio of epoxide functional groups from the epoxy-containing compound (E1) to amine-hydrogens from the diamine and/or polyamine (A1) of no more than 12:1, such as no more than 11:1, such as no more than 10:1, such as no more than 9:1, such as no more than 8:1. The diamine and/or polyamine comprising a cyclic ring (A1) may be used in the reaction mixture generating the epoxide-functional adduct (E2) in an amount sufficient to provide a molar ratio of epoxide functional groups from the epoxy-containing compound (E1) to amine-hydrogens from the diamine and/or polyamine (A1) of 2:1 to 12:1, such as 3:1 to 11:1, such as 4:1 to 10:1, such as 5:1 to 9:1, such as 6:1 to 8:1.

In examples, the epoxy-functional adduct (E2) may be an epoxy-capped polyamine comprising a cyclic ring. For example, E2 may have the following structure (Structure I):

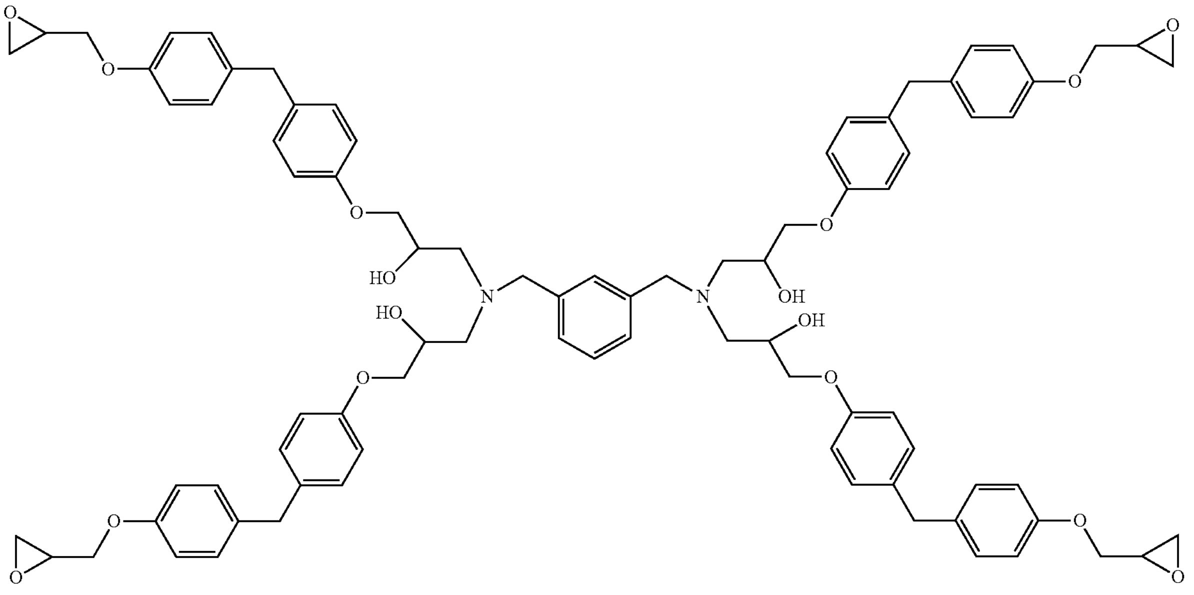 [SMILES: OC(COc1ccc(Cc2ccc(OCC3CO3)cc2)cc1)CN(Cc1cccc(CN(CC(O)COc2ccc(Cc3ccc(OCC4CO4)cc3)cc2)CC(O)COc2ccc(Cc3ccc(OCC4CO4)cc3)cc2)c1)CC(O)COc1ccc(Cc2ccc(OCC3CO3)cc2)cc1]

The epoxy-functional adduct (E2) may further comprise an accelerator, such as a latent a latent accelerator. Useful curing agents and/or accelerators include any of those described below. The curing agent and/or accelerator may be mixed with the epoxy-containing component (E1) or may be mixed with the diamine and/or the polyamine (A1).

The epoxy-containing compound (E1) or the epoxide-functional adduct (E2) of the composition may further include elastomeric particles. As used herein, "elastomeric particles" refers to particles comprised of one or more materials having at least one glass transition temperature (Tg) of greater than −150° C. and less than 30° C., calculated, for example, as described above. The elastomeric particles may be phase-separated from the epoxy in the epoxy-containing compound (E1) and/or the epoxide-functional adduct (E2). As used herein, the term "phase-separated" means forming a discrete domain within a matrix of the epoxy-containing compound (E1) and/or the epoxide-functional adduct (E2).

The elastomeric particles may have a core/shell structure. Suitable core-shell elastomeric particles may be comprised of an acrylic shell and an elastomeric core. The core may comprise natural or synthetic rubbers, polybutadiene, styrene-butadiene, polyisoprene, chloroprene, acrylonitrile butadiene, butyl rubber, polysiloxane, polysulfide, ethylene-vinyl acetate, fluoroelastomer, polyolefin, hydrogenated styrene-butadiene, or combinations thereof. In examples, no more than 50% by weight of the elastomeric particles comprise a polybutadiene core and/or a polysiloxane core based on total weight of the elastomeric particles.

The elastomeric particles may optionally be included in an epoxy carrier resin for introduction into the coating composition. Suitable finely dispersed core-shell elastomeric particles in an average particle size ranging from 20 nm to 400 nm may be master-batched in epoxy resin such as aromatic epoxides, phenolic novolac epoxy resin, bisphenol A and/or bisphenol F diepoxide, and/or aliphatic epoxides, which include cyclo-aliphatic epoxides, at concentrations ranging from 1% to 80% core-shell elastomeric particles by weight based on the total weight of the elastomeric dispersion, such as from 5% to 50%, such as from 15% to 35%. Suitable epoxy resins may also include a mixture of epoxy resins. When utilized, the epoxy carrier resin may be an epoxy-containing component such that the weight of the epoxy-containing component present in the coating composition includes the weight of the epoxy carrier resin.

Exemplary non-limiting commercial core-shell elastomeric particle products using poly(butadiene) rubber particles that may be utilized in the adducts and/or coating compositions of the present invention include core-shell poly(butadiene) rubber powder (commercially available as PARALOID™ EXL 2650A from Dow Chemical), a core-shell poly(butadiene) rubber dispersion (25% core-shell rubber by weight) in bisphenol F diglycidyl ether (commercially available as Kane Ace MX 136), a core-shell poly(butadiene) rubber dispersion (33% core-shell rubber by weight) in Epon® 828 (commercially available as Kane Ace MX 153), a core-shell poly(butadiene) rubber dispersion (33% core-shell rubber by weight) in Epiclon® EXA-835LV (commercially available as Kane Ace MX 139), a core-shell poly(butadiene) rubber dispersion (37% core-shell rubber by weight) in bisphenol A diglycidyl ether (commercially available as Kane Ace MX 257), and a core-shell poly(butadiene) rubber dispersion (37% core-shell rubber by weight) in Epon® 863 (commercially available as Kane Ace MX 267), each available from Kaneka Texas Corporation, and acrylic rubber dispersions.

Exemplary non-limiting commercial core-shell elastomeric particle products using styrene-butadiene rubber particles that may be utilized in the adducts and/or coating compositions include a core-shell styrene-butadiene rubber powder (commercially available as CLEARSTRENGTH® XT100 from Arkema), core-shell styrene-butadiene rubber powder (commercially available as PARALOID™ EXL 2650J), a core-shell styrene-butadiene rubber dispersion (33% core-shell rubber by weight) in bisphenol A diglycidyl ether (commercially available as Fortegra™ 352 from Olin™), core-shell styrene-butadiene rubber dispersion (33% rubber by weight) in low viscosity bisphenol A diglycidyl ether (commercially available as Kane Ace MX 113), a core-shell styrene-butadiene rubber dispersion (25% core-shell rubber by weight) in bisphenol A diglycidyl ether (commercially available as Kane Ace MX 125), a core-shell styrene-butadiene rubber dispersion (25% core-shell rubber by weight) in bisphenol F diglycidyl ether (commercially available as Kane Ace MX 135), a core-shell styrene-butadiene rubber dispersion (25% core-shell rubber by weight) in D.E.N.™-438 phenolic novolac epoxy (commercially available as Kane Ace MX 215), a core-shell styrene-butadiene rubber dispersion (25% core-shell rubber by weight) in Araldite® MY-721 multi-functional epoxy (commercially available as Kane Ace MX 416), a core-shell styrene-butadiene rubber dispersion (25% core-shell rubber by weight) in MY-0510 multi-functional epoxy (commercially available as Kane Ace MX 451), a core-shell styrene-butadiene rubber dispersion (25% core-shell rubber by weight) in Syna Epoxy 21 Cyclo-aliphatic Epoxy from Synasia (commercially available as Kane Ace MX 551), and a core-shell styrene-butadiene rubber dispersion (25% core-shell rubber by weight) in polypropylene glycol (MW 400) (commercially available as Kane Ace MX 715), each available from Kaneka Texas Corporation.

Exemplary non-limiting commercial core-shell elastomeric particle products using polysiloxane rubber particles that may be utilized in the adducts and/or coating compositions include a core-shell polysiloxane rubber powder (commercially available as GENIOPERL® P52 from Wacker), a core-shell polysiloxane rubber dispersion (40% core-shell rubber by weight) in bisphenol A diglycidyl ether (commercially available as ALBIDUIR® EP2240A from Evonik), a core-shell polysiloxane rubber dispersion (25% core-shell rubber by weight) in jER™828 (commercially available as Kane Ace MX 960), a core-shell polysiloxane rubber dispersion (25% core-shell rubber by weight) in Epon® 863 (commercially available as Kane Ace MX 965) each available from Kaneka Texas Corporation.

The average particle size of the elastomeric particles may be at least 20 nm, as measured by transmission electron microscopy (TEM), such as at least 30 nm, such as at least 40 nm, such as at least 50 nm, and may be no more than 400 nm, such as no more than 300 nm, such as no more than 200 nm, such as no more than 150 nm. The average particle size of the elastomeric particles may be 20 nm to 400 nm as measured by TEM, such as 30 nm to 300 nm, such as 40 nm to 200 nm, such as 50 nm to 150 nm. Suitable methods of measuring particle sizes by TEM include suspending elastomeric particles in a solvent selected such that the particles do not swell, and then drop casting the suspension onto a TEM grid which is allowed to dry under ambient conditions. For example, epoxy resin containing core-shell rubber elastomeric particles from Kaneka Texas Corporation can be diluted in butyl acetate for drop casting. Particle size measurements may be obtained from images acquired using a Tecnai T20 TEM operating at 200 kV and analyzed using ImageJ software, or an equivalent instrument and software.

The composition may further comprise a second component comprising a curing agent (A1) or (A2), described in more detail below, that chemically reacts with the epoxy-containing compound (E1) and/or the epoxide-functional adduct (E2) of the first component.

The curing agent of the second component may comprise a diamine comprising a cyclic ring and/or a polyamine comprising a cyclic ring (A1) and includes ortho-, meta-, and para-isomers of aromatic diamines and polyamines or any mixtures of these isomers. The diamine comprising a cyclic ring and/or polyamine comprising a cyclic ring (A1) also includes amines containing non-aromatic ring structures, such as aliphatic rings or heterocyclic rings. The diamine and/or the polyamine curing agent may be used to at least partially cure the composition by reacting with the epoxy-containing compound of the first component to form a polymeric matrix upon combining the first and second components of the composition.

In examples, the diamine and/or the polyamine may contain a cyclic ring. The cyclic ring may be intermolecular or may be pendant. For example, the diamine and/or the polyamine may comprise an aromatic ring such as xylylene diamine, phenylene diamine, methylenedianiline, diaminotoluene, diaminophenol, diamino diphenyl sulfone, 4,4'-oxydianiline, diethyl toluene diamine, methyl-bis(methylthio)benzenediamine (Ethacure 300, for example, available from Albemarle), aminobenzylamine, 5,5'-methylenedifurfurylamine, 5,5'-ethylidenedifurfurylamine, or combinations thereof. The diamine and/or polyamine may also comprise a non-aromatic cyclic ring such as isophorone diamine, 4,4-diaminodicyclohexylmethane, diaminocyclohexane, bis(aminomethyl)norbornane, bis(aminomethyl)cyclohexane, piperazine, aminoethylpiperazine, bis(aminopropyl)piperazine, or combinations thereof.

In other examples, the second component may further comprise a curing agent comprising an oligomeric cyclic ring-containing diamine or polyamine in addition to the diamine and/or the polyamine (A1) described above. As used herein, the term "oligomer" refers to a molecular complex of monomers having a finite number of repeating units. Optionally, the amino-functional oligomer may comprise an aromatic ring. In an example, the amine-functional oligomer may comprise an oligomeric amine reaction product of a reaction mixture comprising xylylene diamine and epichlorohydrin, which is commercially available as Gaskamine 328 (Mitsubishi Gas). In an example, the amine-functional oligomer may have one of the following structures:

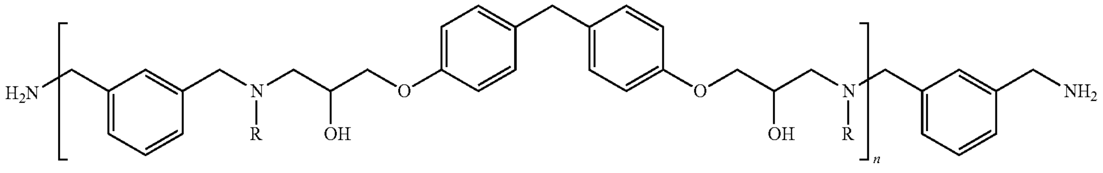

R = H or

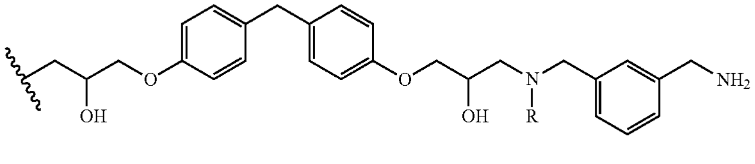

where n is at least 1, and the presence of R substituents on the amine demonstrate the possibility of branched structures (Structures II and III, respectively). In other examples, the curing agent of the second component may comprise a cyclic ring containing diamine partially reacted with a monofunctional epoxide. In an example, the curing agent of the second component may comprise the reaction product of excess xylylene diamine and glycidol, having the following structure:

(Structure III)

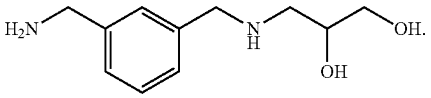

Optionally, in addition to the diamine or polyamine containing a cyclic ring, the second component may additionally comprise a monoamine, diamine, or polyamine. Useful monoamines include, but are not limited to, aniline, ethanolamine, N-methylethanolamine, butylamine, benzylamine, allylamine, ethylhexylamine, polypropylene glycol monoamines such as Jeffamine-M600 and Jeffamine M-2005 available from Huntsman, polyethylene glycol monoamines such as Jeffamine M-1000 and Jeffamine M-2070 available from Huntsman. Useful diamines include, but are not limited to, ethylenediamine, tetramethylenediamine, hexamethylenediamine, 2-methylpentamethylenediamine (available as Dytek A from Invista), polyether diamines such as those of the Jeffamine D, ED, or EDR series available from Huntsman. Useful polyamines include but are not limited to diethylenetriamine, triethylenetetramine, tetraethylenepentamine, tris(2-aminoethyl)amine, tris(3-aminopropyl)amine, and trifunctional polyether amines such as the Jeffamine T-403, Jeffamine T-3000, and Jeffamine T-5000 available from Huntsman.

Optionally, the curing agent of the second component may comprise a diamine comprising a cyclic ring and/or a polyamine comprising a cyclic ring in an amount of at least 20 percent by weight based on total weight of the diamine and/or polyamine present in the second component, such as at least 30 percent by weight, such as at least 40 percent by weight, such as at least 50 percent by weight, and may comprise a diamine comprising a cyclic ring and/or a polyamine comprising a cyclic ring in an amount of 100 percent by weight based on total weight of the diamine and/or polyamine in the second component, such as no more than 90 percent by weight, such as no more than 80 percent by weight, such as no more than 70 percent by weight, such as no more than 60 percent by weight. The curing agent of the second component may comprise a diamine comprising a cyclic ring and/or a polyamine comprising a cyclic ring in an amount of 20 percent by weight to 100 percent by weight based on total weight of the diamine and/or polyamine in the second component, such as 30 percent by weight to 90 percent by weight, such as 40 percent by weight to 80 percent by weight, such as 50 percent by weight to 70 percent by weight. In an example, the cyclic ring may comprise a benzene. In an example, the diamine comprising a cyclic ring may comprise xylylene diamine.

The diamine and/or polyamine (A1) curing agent may be present in the composition in an amount sufficient to provide a molar ratio of epoxide functional groups from the epoxy-containing compound to amine-hydrogens from the diamine and/or polyamine curing agent of at least 0.5:1.0, such as at least 0.75:1.0, and may be present in the composition in amount to provide a molar ratio of epoxide functional groups from the epoxy-containing compound to amine-hydrogens from the diamine and/or polyamine curing agent of no more than 1.5:1.0, such as no more than 1.25 to 1.0. The diamine and/or polyamine curing agent may be present in the composition in an amount sufficient to provide a molar ratio of epoxide functional groups from the epoxy-containing compound to amine-hydrogens from the diamine and/or polyamine curing agent of 0.5:1.0 to 1.5:1.0, such as 0.75:1.0 to 1.25 to 1.0.

Alternatively, the second component of the composition may comprise an amine-functional adduct (A3).

The monoamine, diamine, or polyamine (A2) used to synthesize the amine-functional adduct (A3) may comprise an aliphatic amine, an araliphatic amine, and/or a cycloaliphatic amine. Useful monoamines include, but are not limited to, aniline, ethanolamine, N-methylethanolamine, butylamine, benzylamine, allylamine, ethylhexylamine, polypropylene glycol monoamines such as Jeffamine-M600 and Jeffamine M-2005 available from Huntsman, polyethylene glycol monoamines such as Jeffamine M-1000 and Jeffamine M-2070 available from Huntsman. Useful diamines include, but are not limited to, ethylenediamine, tetramethylenediamine, hexamethylenediamine, 2-methylpentamethylenediamine (available as Dytek A from Invista), isophorone diamine, 4,4-diaminodicyclohexylmethane, diaminocyclohexane, bis(aminomethyl)norbornane, bis(aminomethyl)cyclohexane, piperazine, aminoethylpiperazine, polyether diamines such as those of the Jeffamine D, ED, or EDR series available from Huntsman. Useful polyamines include but are not limited to diethylenetriamine, triethylenetetramine, tetraethylenepentamine, tris(2-aminoethyl)amine, tris(3-aminopropyl)amine, and trifunctional polyether amines such as the Jeffamine T-403, Jeffamine T-3000, and Jeffamine T-5000 available from Huntsman.

The monoamine, diamine, and/or polyamine (A2) may be used in the reaction mixture generating the amine-functional adduct (A3) in an amount sufficient to provide a molar ratio of amine-hydrogens from the monoamine, diamine, and/or polyamine (A2) to epoxide functional groups from the epoxide-functional adduct (E2) of at least 2:1, such as at least 3:1, such as at least 4:1, such as at least 5:1, such as at least 6:1, such as at least 7:1, such as at least 8:1, such as at least 9:1, such as at least 10:1.

The amine-functional adduct (A3) may further comprise an accelerator. Useful accelerators include any of those described below. The accelerator may be mixed with the epoxide-functional adduct (E2) or may be mixed with the monoamine, diamine and/or polyamine (A2).

The second component of the composition may further comprise elastomeric particles. For example, the diamine comprising a cyclic ring and/or the polyamine comprising a cyclic ring (A1) and the amine-functional adduct (A3) each may further comprise elastomeric particles. Useful elastomeric particles include those described above, including elastomeric particles having a core-shell structure. For example, the elastomeric particles may optionally be introduced into the second component of the coating composition as solid particles, such as core-shell elastomeric particles having an average particle size of 20 nm to 400 nm.

Elastomeric particles, if present at all, and whether present in the first component and/or the second component, may be present in the composition in a total amount of at least 1 percent by weight based on total weight of the composition, such as at least 3 percent by weight, such as at least 5 percent by weight, and may be present in the composition in a total amount of no more than 50 percent by weight based on total weight of the composition, such as no more than 40 percent by weight, such as no more than 25 percent by weight. Elastomeric particles, if present at all, and whether present in the first component and/or the second component, may be present in the composition in a total amount of 1 percent by weight to 50 percent by weight based on total weight of the composition, such as 3 percent by weight to 40 percent by weight, such as 5 percent by weight to 25 percent by weight.

Optionally, the first component and/or the second component of the composition may further comprise an accelerator. Likewise, any of the components used to form the epoxide-functional adduct (E2) or the amine-functional adduct (E3) may further comprise an accelerator.

In examples, the accelerator may comprise, or consist essentially of, or consist of, a guanidine. It will be understood that "guanidine," as used herein, refers to guanidine and derivatives thereof. For example, the curing agent that may be used includes guanidines, substituted guanidines, substituted ureas, melamine resins, guanamine derivatives, and/or mixtures thereof. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide, e.g. Dyhard® available from AlzChem). Representatives of suitable guanamine derivatives which may be mentioned are alkylated benzoguanamine resins, benzoguanamine resins or methoxymethylethoxymethylbenzoguanamine.

For example, the guanidine may comprise a compound, moiety, and/or residue having the following general structure:

(IV)

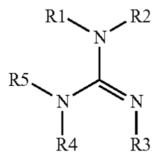

wherein each of R1, R2, R3, R4, and R5 (i.e., substituents of structure (IV)) comprise hydrogen, (cyclo)alkyl, aryl, aromatic, organometallic, a polymeric structure, or together can form a cycloalkyl, aryl, or an aromatic structure, and wherein R1, R2, R3, R4, and R5 may be the same or different. As used herein, "(cyclo)alkyl" refers to both alkyl and cycloalkyl. When any of the R groups "together can form a (cyclo)alkyl, aryl, and/or aromatic group", it is meant that any two adjacent R groups are connected to form a cyclic moiety, such as the rings in structures (V)-(VIII) below.

It will be appreciated that the double bond between the carbon atom and the nitrogen atom that is depicted in structure (IV) may be located between the carbon atom and another nitrogen atom of structure (IV). Accordingly, the various substituents of structure (IV) may be attached to different nitrogen atoms depending on where the double bond is located within the structure.

The guanidine may comprise a cyclic guanidine such as a guanidine of structure (IV) wherein two or more R groups of structure (IV) together form one or more rings. In other words, the cyclic guanidine may comprise ≥1 ring(s). For example, the cyclic guanidine may either be a monocyclic guanidine (1 ring) such as depicted in structures (V) and (VI) below, or the cyclic guanidine may be bicyclic or polycyclic guanidine (≥2 rings) such as depicted in structures (VII) and (VIII) below.

(V)

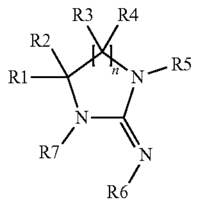

(VI)

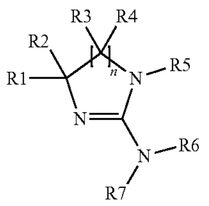

(VII)

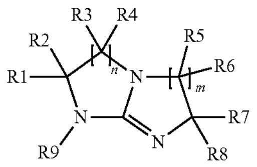

(VIII)

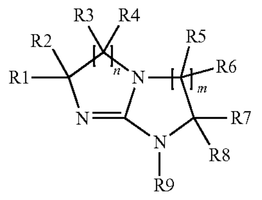

Each substituent of structures (V) and/or (VI), R1-R7, may comprise hydrogen, (cyclo)alkyl, aryl, aromatic, organometallic, a polymeric structure, or together can form a cycloalkyl, aryl, or an aromatic structure, and wherein R1-R7 may be the same or different. Similarly, each substituent of structures (VII) and (VIII), R1-R9, may be hydrogen, alkyl, aryl, aromatic, organometallic, a polymeric structure, or together can form a cycloalkyl, aryl, or an aromatic structure, and wherein R1-R9 may be the same or different. Moreover, in some examples of structures (V) and/or (VI), certain combinations of R1-R7 may be part of the same ring structure. For example, R1 and R7 of structure (V) may form part of a single ring structure. Moreover, it will be understood that any combination of substituents (R1-R7 of structures (V) and/or (VI) as well as R1-R9 of structures (VII) and/or (VIII)) may be chosen so long as the substituents do not substantially interfere with the catalytic activity of the cyclic guanidine.

Each ring in the cyclic guanidine may be comprised of ≥5 members. For example, the cyclic guanidine may comprise a 5-member ring, a 6-member ring, and/or a 7-member ring. As used herein, the term "member" refers to an atom located in a ring structure. Accordingly, a 5-member ring will have 5 atoms in the ring structure ("n" and/or "m"=1 in structures (V)-(VIII)), a 6-member ring will have 6 atoms in the ring structure ("n" and/or "m"=2 in structures (V)-(VIII)), and a 7-member ring will have 7 atoms in the ring structure ("n" and/or "m"=3 in structures (V)-(VIII)). It will be appreciated that if the cyclic guanidine is comprised of ≥2 rings (e.g., structures (VII) and (VIII)), the number of members in each ring of the cyclic guanidine can either be the same or different. For example, one ring may be a 5-member ring while the other ring may be a 6-member ring. If the cyclic guanidine is comprised of ≥3 rings, then in addition to the combinations cited in the preceding sentence, the number of members in a first ring of the cyclic guanidine may be different from the number of members in any other ring of the cyclic guanidine.

It will also be understood that the nitrogen atoms of structures (V)-(VIII) may further have additional atoms attached thereto. Moreover, the cyclic guanidine may either be substituted or unsubstituted. For example, as used herein in conjunction with the cyclic guanidine, the term "substituted" refers to a cyclic guanidine wherein R5, R6, and/or R7 of structures (V) and/or (VI) and/or R9 of structures (VII) and/or (VIII) is not hydrogen. As used herein in conjunction with the cyclic guanidine, the term "unsubstituted" refers to a cyclic guanidine wherein R1-R7 of structures (V) and/or (VI) and/or R1-R9 of structures (VII) and/or (VIII) are hydrogen.

The cyclic guanidine may comprise a bicyclic guanidine, and the bicyclic guanidine may comprise 1,5,7-triazabicyclo[4.4.0]dec-5-ene ("TBD" or "BCG") or 7-methyl-1,5,7-triazabicyclo[4.4.0]dec-5-ene (MTBD).

Other useful accelerators may comprise amidoamine or polyamide accelerators, such as, for example, one of the Ancamide® products available from Air Products, amine, amino-containing phenols, dihydrazide, imidazole, or dicyandiamide adducts and complexes, such as, for example, one of the Ajicure® products available from Ajinomoto Fine Techno Company, 3,4-dichlorophenyl-N,N-dimethylurea (A.K.A. Diuron) available from Alz Chem, or combinations thereof.

Useful accelerators that may be included in the second component of the composition may comprise secondary amines, tertiary amines, cyclic tertiary amines, amidines, or combinations thereof. The cyclic tertiary amine may comprise 1,4-diazabicyclo[2.2.2]octane ("DABCO"), 1,8-diazabicylo[5.4.0]undec-7-ene ("DBU"), 1,5-diazabicyclo[4.3.0]non-5-ene ("DBN"), and combinations thereof. Additional examples of suitable accelerators include, pyridine, imidazole, dimethylaminopyridine, 1-methylimidazole, N,N'-carbonyldiimidazole, [2,2]bipyridine, 2,4,6-tris(dimethylamino methyl)phenol, 3,5-dimethylpyrazole, and combinations thereof. Additional examples of useful accelerators include Mannich bases, tetraalkyl ammonium salts, metal salts, and strong bases.

The accelerator, if present at all, may be present in the second component of the composition in an amount of at least 0.5 percent by weight based on total weight of the composition, such as at least 1 percent by weight, and may be present in an amount of no more than 55 percent by weight based on total weight of the composition, such as no more than 20 percent by weight. The accelerator, if present at all, may be present in the second component of the composition in an amount of 0.5 percent by weight to 55 percent by weight based on total weight of the composition, such as 1 percent by weight to 20 percent by weight.

A filler material or more than one filler material may optionally be added to the first and/or second component of the composition, the epoxide-functional adduct (E2), and/or the amine-functional adduct (A3) described above. Useful fillers that may be introduced to provide improved mechanical properties include materials such as fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength. Additionally, filler material may optionally be graphene and graphenic carbon particles (for example, xGnP graphene nanoplatelets commercially available from XG Sciences), and/or for example, carbon particles having structures comprising one or more layers of one-atom-thick planar sheets of sp2-bonded carbon atoms that are densely packed in a honeycomb crystal lattice. The average number of stacked layers may be less than 100, for example, less than 50. The average number of stacked layers may be 30 or less, such as 20 or less, such as 10 or less, such as 5 or less. The graphenic carbon particles may be substantially flat; however, at least a portion of the planar sheets may be substantially curved, curled, creased, or buckled. The particles typically do not have a spheroidal or equiaxed morphology. Suitable graphenic carbon particles are described in U.S. Publication No. 2012/0129980, at paragraphs [0059]-[0065], the cited portion of which is incorporated herein by reference. Other suitable graphenic carbon particles are described in U.S. Pat. No. 9,562,175, at 6:6 to 9:52, the cited portion of which are incorporated herein by reference.

Organic and/or inorganic fillers, such as those that are substantially spherical, may optionally be added to the first and/or second component of the composition, the epoxide-functional adduct (E2), and/or the amine-functional adduct (A3) described above. Useful organic fillers that may be introduced include cellulose, starch, and acrylic. Useful inorganic fillers that may be introduced include borosilicate, aluminosilicate, calcium inosilicate (Wollastonite), mica, silica and calcium carbonate. The organic and inorganic fillers may be solid, hollow, or layered in composition and may range in size from 10 nm to 1 mm in at least one dimension, measured, for example by TEM or SEM.

Optionally, additional fillers, thixotropes, colorants, tints and/or other materials also may be added to the first and/or second component of the composition, the epoxide-functional adduct (E2), and/or the amine-functional adduct (A3) described above.

Useful thixotropes that may be used include untreated fumed silica and treated fumed silica, castor wax, clay, organo clay and combinations thereof. In addition, fibers such as synthetic fibers like Aramid® fiber and Kevlar® fiber, acrylic fibers, and/or engineered cellulose fiber may also be utilized.

Useful colorants, dyes, or tints may include red iron pigment, titanium dioxide, calcium carbonate, and phthalocyanine blue and combinations thereof.

Useful fillers that may be used in conjunction with thixotropes may include inorganic fillers such as inorganic clay or silica and combinations thereof.

Exemplary other materials that may be utilized include, for example, calcium oxide and carbon black and combinations thereof.

Such fillers, if present at all, may be present in the first and/or second component of the composition, such as no more than 15 percent by weight based on total weight of the composition, such as no more than 10 percent by weight, such as no more than 5 percent by weight. Such fillers may be present in the first and/or second component of the composition in an amount of 0 percent to 25 percent by weight based on total weight of the composition, such as 0.1 percent by weight to 15 percent by weight, such as 0.5 percent by weight to 10 percent by weight, such as 1 percent by weight to 5 percent by weight.

Optionally, the composition or the adducts (E2) and (A3) described above may be substantially free, or essentially free, or completely free, of platy fillers such as talc, pyrophyllite, chlorite, vermiculite, or combinations thereof. Optionally, the composition may be substantially free, or essentially free, or completely free, of alumina fillers, including plate-like alumina particles, spherical alumina particles, and/or amorphous alumina particles.

The composition or the epoxide-functional adduct (E2) or the amine-functional adduct (A3) described above may further comprise an additive or more than one additive. As used herein, the term “additives” refers to ingredients or components included in the coating composition in addition to the epoxy-containing compound, the polyamine curing agent, the elastomeric particles, the second curing agent (if any), the accelerator (if any), and the fillers (if any) described herein. Exemplary non-limiting examples of such additives include flexibilizers such as Flexibilzer® DY 965 from Huntsman Corporation, reactive liquid rubber, non-reactive liquid rubber, epoxy-amine adducts (such as those described above but, when present, different from the epoxy-containing compound present in the coating composition), epoxy-thiol adducts, blocked isocyanates, capped isocyanates, epoxy-urethanes, epoxy-ureas, modified epoxies from Hexion, HELOXY™ modifiers from Hexion, adhesion promoters, rust inhibitors, solvent, silane coupling agents such as Silquest A-187 from Momentive, flame retardants, colloidal silica such as NANOPDX® dispersions from Evonik, thermoplastic resins, acrylic polymer beads such as ZEFIAC® beads from AICA Kogyo Co, cyclic carbonate-functional molecules, or combinations thereof.

Such additives, if present at all, may be present in the composition in an amount of at least 1 percent by weight based on total weight of the composition, such as at least 2 percent by weight, and may be present in the composition in an amount of no more than 25 percent by weight based on total weight of the composition, such as no more than 10 percent by weight. Such additives, if present at all, may be present in the composition in an amount of 1 percent by weight to 25 percent by weight based on total weight of the composition, such as 2 percent by weight to 10 percent by weight.

The present invention also is directed to a method for treating a substrate comprising, or consisting essentially of, or consisting of, mixing one of the first components and one of the second components described above to form one of the compositions disclosed herein, and applying the composition to at least a portion of a substrate surface. Likewise, the present invention also is directed to a method for treating a substrate comprising, or consisting essentially of, or consisting of, mixing one of the reactants described above to form the epoxy-containing adduct (E2) or the amine-containing adduct (A3). The composition can be applied to the surface of the substrate in any number of different ways, non-limiting examples of which include brushes, rollers, films, pellets, spray guns, applicator guns, and injectors. Optionally, the composition may be contacted with at least a portion of surface of a second substrate such that the composition is located between the first substrate and the second substrate. Optionally, the composition may be injected into, on or around composite sheets, meshes, and the like.

Following application to a substrate surface, the composition may be at least partially cured at ambient or slightly thermal conditions. Optionally, the composition may be cured by a two-step curing process. As used herein, the term “two-step curing process” refers to a process comprising a first step during which the composition is allowed to cure at ambient or slightly thermal conditions followed by a second step during which the composition may be subjected to an external energy source to further react the components of the composition and effectuate additional cure of the composition. For example, the coating composition may be allowed to cure at room temperature or slightly thermal conditions during the first step. Next, the coating composition may be cured during the second step by baking and/or curing at elevated temperature, such as at a temperature of at least 50° C., such as at least 70° C., such as at least 80° C., such as at least 100° C., and in some cases at a temperature of no more than 250° C., such as no more than 200° C., such as no more than 180° C., such as no more than 170° C., such as no more than 165° C., and in some cases at a temperature of from 50° C. to 200° C., from 70° C. to 180° C., from 80° C. to 170° C., from 100° C. to 165° C., and for any desired time period (e.g., from 5 minutes to 1 hour) sufficient to at least partially cure the coating composition on the substrate (s).

For example, the adduct or the composition may be applied to a surface of either one or both of the substrate materials being bonded to form an adhesive bond therebetween and the substrates may be aligned and pressure and/or spacers may be added to control bond thickness.

The adduct or the composition may be applied to cleaned or uncleaned (i.e., including oily or oiled) substrate surfaces. The adduct or the composition may be cured to form a coating, layer or film on the substrate surface as described herein. The coating, layer or film, may be, for example, a sealant or an adhesive.

For example, the present invention may be a method for forming a bond between two substrates for a wide variety of potential applications in which the bond between the substrates provides particular mechanical properties related to both lap shear strength and displacement.

As stated above, the compositions of the present disclosure may form a coating, a seal, or an adhesive on a substrate or a substrate surface. The composition may be applied to substrate surfaces, including, by way of non-limiting example, a vehicle body, components of an automobile frame or an airplane, parts used in or on a vehicle, to armor assemblies such as those on a tank, or to protective clothing such as body armor, personal armor, suits of armor, and the like. The coating formed by the composition of the present invention provides sufficient lap shear strength and displacement. The composition may be applied alone or as part of a system. The composition may also be applied to a substrate that has been deoxidized, pretreated, coated with an electrodepositable coating, and/or coated with additional layers such as a primer, basecoat, or topcoat.

The present invention also is directed to a substrate having a surface, in which at least a portion of the surface is coated with one of the compositions of the present invention to form a coating thereon. The present invention also is directed to a part having a surface, in which at least a portion of the surface is coated with one of the compositions of the present invention to form a coating thereon. The present invention is also directed to an article comprising first and second substrates each having a surface, in which at least a portion of one of the surfaces is coated with one of the compositions of the present invention to form a coating thereon between the first and second substrates. The present invention is also directed to a composition of the present invention injected into, on, and/or around a fibrous sheet or mesh. The fibrous sheet or mesh may be woven or non-woven.

As described above, substrates treated with the compositions of the present invention may have a film, coating, or the like formed by the coating composition, applied to at least a portion of the substrate surface. In examples, the coating composition may have a dry film thickness of at least 12.5 micrometers (0.5 mil), such as at least 25 micrometers (1 mil), such as at least 75 micrometers (3 mil), and in some instances may have a dry film thickness of no more than 1270 micrometers (50 mil), such as no more than 635 micrometers (25 mil), such as no more than 405 micrometers (16 mil). In examples, the coating composition may have a dry film thickness of 12.5 micrometers to 1270 micrometers, such as 25 micrometers to 635 micrometers, such as 75 micrometers to 405 micrometers.

The present invention is also directed to an adhesive having a lap shear displacement of at least 2.5 mm at failure, such as at least 3.0 mm, such as at least 3.1 mm and a lap shear strength of at least 30.0 MPa, such as at least 32 MPa, such as at least 35 MPa, wherein the lap shear displacement and the lap shear strength are measured according to ASTM D1002-10 using 2024-T3 aluminum substrate of 1.6 mm thickness, as measured by an INSTRON 5567 machine in tensile mode with a pull rate of 1.3 mm per minute.

It has been surprisingly discovered that the compositions of the present invention, in an at least partially cured state, may have a lap shear displacement at failure of at least 2.5 mm, such as at least 3.0 mm, such as at least 3.1 mm, and a lap shear strength of at least 30 MPa, such as at least 32 MPa, such as at least 35 MPa, wherein lap shear displacement and lap shear strength each are measured according to ASTM D1002-10 using 2024-T3 aluminum substrate of 1.6 mm thickness, as measured by an INSTRON 5567 machine in tensile mode with a pull rate of 1.3 mm per minute.

The substrates that may be coated by compositions of the present invention are not limited. Suitable substrates useful in the present invention include, but are not limited to, materials such as metals or metal alloys, ceramic materials such as boron carbide or silicon carbide, polymeric materials such as hard plastics including filled and unfilled thermoplastic materials or thermoset materials, woven or nonwoven fibrous sheets or meshes, or composite materials. Other suitable substrates useful in the present invention include, but are not limited to, glass or natural materials such as wood. For example, suitable substrates include rigid metal substrates such as ferrous metals, aluminum, aluminum alloys, magnesium titanium, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Aluminum alloys of the 1XXX, 2XXX, 3XXX, 4XXX, 5XXX, 6XXX, 7XXX, or 8XXX series as well as clad aluminum alloys and cast aluminum alloys of the A356, 1XX.X, 2XX.X, 3XX.X, 4XX.X, 5XX.X, 6XX.X, 7XX.X, or 8XX.X series also may be used as the substrate. Magnesium alloys of the AZ31B, AZ91C, AM60B, or EV31A series also may be used as the substrate. The substrate used in the present invention may also comprise titanium and/or titanium alloys of grades 1-36 including H grade variants. Other suitable non-ferrous metals include copper and magnesium, as well as alloys of these materials. Suitable metal substrates for use in the present invention include those that are used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, and industrial structures and components. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091. The substrate may comprise a composite material such as a plastic or a fiberglass composite. The substrate may be a fiberglass and/or carbon fiber composite. The compositions of the present invention are particularly suitable for use in various industrial or transportation applications including automotive, light and heavy commercial vehicles, marine, or aerospace.

The 2K compositions disclosed herein surprisingly may be used in any suitable additive manufacturing technology, such as extrusion, jetting, and binder jetting.

The present disclosure is directed to the production of structural articles, such as by way of non-limiting example, sound damping pads, using three-dimensional printing. A three-dimensional article may be produced by forming successive portions or layers of an article by depositing the composition of the present invention onto a substrate and thereafter depositing additional portions or layers of the composition over the underlying deposited portion or layer and/or adjacent the previously deposited portion or layer. Layers can be successively deposited adjacent to a previously deposited layer to build a printed article. First and second components of the composition can be mixed and then deposited or the first and second components of the composition can be deposited separately. When deposited separately, the first and second components can be deposited simultaneously, sequentially, or both simultaneously and sequentially.

By "portions of an article" is meant subunits of an article, such as layers of an article. The layers may be on successive horizontal parallel planes. The portions may be parallel planes of the deposited material or beads of the deposited material produced as discreet droplets or as a continuous stream of material. The first and second components may each be provided neat or may also include a solvent (organic and/or water) and/or other additives as described below. First and second components provided by the present disclosure may be substantially free of solvent. By substantially free is meant that the first and second components comprise less than 5 wt %, less than 4 wt %, less than 2 wt %, or less than 1 wt % of solvent, where wt % is based on the total weight of the first component or the second component, as the case may be. Similarly, the composition provided by the present disclosure may be substantially free of solvent, such as having less than 5 wt %, less than 4 wt %, less than 2 wt %, or less than 1 wt % of solvent, where wt % is based on the total weight of the composition.

The first and second components may be mixed together and subsequently deposited as a mixture of components that react to form portions of an article. For example, two components may be mixed together and deposited as a mixture of components that react to form a thermoset by delivery of at least two separate streams of the components into a mixer such as a static mixer and/or a dynamic mixer to produce a single stream that is then deposited. The components may be at least partially reacted by the time a composition comprising the reaction mixture is deposited. The deposited reaction mixture may react at least in part after deposition and may also react with previously deposited portions and/or subsequently deposited portions of the article such as underlying layers or overlying layers of the article.

Two or more components can be deposited using any suitable equipment. The selection of suitable deposition equipment depends on a number of factors including the deposition volume, the viscosity of the composition and the complexity of the part being fabricated. Each of the two or more components can be introduced into an independent pump and injected into a mixer to combine and mix the two components. A nozzle can be coupled to the mixer and the mixed composition can be pushed under pressure or extruded through the nozzle.

A pump can be, for example, a positive displacement pump, a syringe pump, a piston pump, or a progressive cavity pump. The two pumps delivering the two components can be placed in parallel or placed in series. A suitable pump can be capable of pushing a liquid or viscous liquid through a nozzle orifice. This process can also be referred to as extrusion. A component can be introduced into the mixer using two pumps in series.

For example, the first and second components can be deposited by dispensing materials through a disposable nozzle attached to a progressive cavity two-component dosing system such as a ViscoTec eco-DUO 450 precision dosing system, where the first and second components are mixed in-line. A two-component dosing system can comprise, for example, two progressive cavity pumps that separately dose reactants into a disposable static mixer dispenser or into a dynamic mixer. Other suitable pumps include positive displacement pumps, syringe pumps, piston pumps, and progressive cavity pumps. Upon dispensing, the materials of the first and second components form an extrudate which can be deposited onto a surface to provide an initial layer of material and successive layers on a base. The deposition system can be positioned orthogonal to the base, but also may be set at any suitable angle to form the extrudate such that the extrudate and deposition system form an obtuse angle with the extrudate being parallel to the base. The extrudate refers to the combined components, i.e., a composition, that have been mixed, for example, in a static mixer or in a dynamic mixer. The extrudate can be shaped upon passing through a nozzle.

The base, the deposition system, or both the base and the deposition system may be moved to build up a three-dimensional article. The motion can be made in a predetermined manner, which may be accomplished using any suitable CAD/CAM method and apparatus such as robotics and/or computerized machine tool interfaces.

An extrudate may be dispensed continuously or intermittently to form an initial layer and successive layers. For intermittent deposition, a dosing system may interface with a relay switch to shut off the pumps, such as the progressive cavity pumps and stop the flow of reactive materials. Any suitable switch such as an electromechanical switch that can be conveniently controlled by any suitable CAD/CAM methodology can be used.

A deposition system can include an in-line static and/or dynamic mixer as well as separate pressurized pumping compartments to hold the at least two components and feed the materials into the static and/or dynamic mixer. A mixer such as an active mixer can comprise a variable speed central impeller having high shear blades within a conical nozzle. A range of conical nozzles may be used which have an exit orifice dimension, for example, from 0.2 mm to 50 mm, from 0.5 mm to 40 mm, from 1 mm to 30 mm, or from 5 mm to 20 mm.

A range of static and/or dynamic mixing nozzles may be used which have, for example, an exit orifice dimension from 0.6 mm to 2.5 mm, and a length from 30 mm to 150 mm. For example, an exit orifice diameter can be from 0.2 mm to 4.0 mm, from 0.4 mm to 3.0 mm, from 0.6 mm to 2.5 mm, from 0.8 mm to 2 mm, or from 1.0 mm to 1.6 mm. A static mixer and/or dynamic can have a length, for example, from 10 mm to 200 mm, from 20 mm to 175 mm, from 30 mm to 150 mm, or from 50 mm to 100 mm. A mixing nozzle can include a static and/or dynamic mixing section and a dispensing section coupled to the static and/or dynamic mixing section. The static and/or dynamic mixing section can be configured to combine and mix the first and second components. The dispensing section can be, for example, a straight tube having any of the above orifice diameters. The length of the dispensing section can be configured to provide a region in which the components can begin to react and build viscosity before being deposited on the article. The length of the dispensing section can be selected, for example, based on the speed of deposition, the rate of reaction of the first and second components, and the desired viscosity.

First and second components can have a residence time in the static and/or dynamic mixing nozzle, for example, from 0.25 seconds to 5 seconds, from 0.3 seconds to 4 seconds, from 0.5 seconds to 3 seconds, or from 1 seconds to 3 seconds. Other residence times can be used as appropriate based on the curing chemistries and curing rates.

In general, a suitable residence time is less than the gel time of the composition. A suitable gel time can be less than 10 min, less than 8 min, less than 6 min, less than 5 min, less than 4 min, less than 3 min, less than 2 min, or less than 1 min. A gel time of the composition can be, for example, from 0.5 min to 10 min, from 1 min to 7 min, from 2 min to 6 min, or from 3 min to 5 min.

Compositions provided by the present disclosure can have a volume flow rate, for example, from 0.1 mL/min to 20,000 mL/min, such as from 1 mL/min to 12,000 mL/min, from 5 mL/min to 8,000 mL/min, or from 10 mL/min to 6,000 mL min. The volume flow rate can depend, for example, on the viscosity of the composition, the extrusion pressure, the nozzle diameter, and the reaction rate of the first and second components.

A composition can be used at a print speed, for example, from 1 mm/sec to 400 mm/sec, such as from 5 mm/sec to 300 mm/sec, from 10 mm/sec to 200 mm/sec, or from 15 mm/sec to 150 mm/sec. The printed speed can depend, for example, on the viscosity of the composition, the extrusion pressure, the nozzle diameter, and the reaction rate of the components. The print speed refers to the speed at which a nozzle used to extrude a composition move with respect to a surface onto which the composition is being deposited.

A composition can have a gel time, for example, less than 5 minutes, less than 4 minutes, less than 3 minutes, less than 2 minutes, less than 1 minute, less than 45 seconds, less than 30 seconds, less than 15 seconds, or less than 5 seconds. A composition can have a gel time, for example, from 0.1 seconds to 5 minutes, from 0.2 seconds to 3 minutes, from 0.5 seconds to 2 minutes, from 1 second to 1 minute, or from 2 seconds to 40 seconds. Gel time is considered as the time following mixing when the composition is no longer stirrable by hand.

A static and/or dynamic mixing nozzle can be heated or cooled to control, for example, the rate of reaction between the first and second components and/or the viscosity of the first and second components. An orifice of a deposition nozzle can have any suitable shape and dimensions. A system can comprise multiple deposition nozzles. The nozzles can have a fixed orifice dimension and shape, or the nozzle orifice can be controllably adjusted. The mixer and/or the nozzle may be cooled to control an exotherm generated by the reaction of the first and second components.

Methods provided by the present disclosure include printing the composition on a fabricated part. Methods provided by the present disclosure include directly printing parts.

Using the methods provided by the present disclosure parts can be fabricated. The entire part can be formed from one of the compositions disclosed herein, one or more portions of a part can be formed from one of the compositions disclosed herein, one or more different portions of a part can be formed using the compositions disclosed herein, and/or one or surfaces of a part can be formed from a composition provided by the present disclosure. In addition, internal regions of a part can be formed from a composition provided by the present disclosure.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims and aspects appended and any and all equivalents thereof.

Aspects

In the following, some non-limiting aspects of the present invention are summarized:

Aspect 1. An epoxide-functional adduct (E2) comprising a first reaction product of a reaction mixture comprising (a) an epoxy-containing compound (E1) and (b) a diamine comprising a cyclic ring and/or a polyamine comprising a cyclic ring (A1).

Aspect 2. The epoxide-functional adduct of Aspect 1, wherein the diamine and/or the polyamine (A1) has at least one carbon positioned between the cyclic ring and at least one amino functional group.

Aspect 3. The epoxide-functional adduct of Aspect 1 or Aspect 2, wherein the epoxy-containing compound (E1) comprises bisphenol A, bisphenol F, a novolac resin, or combinations thereof.

Aspect 4. The epoxide-functional adduct of any of the preceding Aspects, wherein the diamine and/or the polyamine (A1) comprises xylylene diamine, phenylene diamine, diaminotoluene, diaminophenol, diaminodiphenyl methane, bis(aminomethyl)cyclohexane, or combinations thereof.

Aspect 5. The epoxide-functional adduct of any of the preceding Aspects, wherein a molar ratio of epoxide functional groups from the epoxy-containing compound (E1) to amine hydrogens from the diamine comprising the cyclic ring and/or the polyamine comprising the cyclic ring (A1) is 2:1 to 12:1.

Aspect 6. The epoxide-functional adduct of any of the preceding Aspects, wherein the first reaction product comprises an epoxy-capped polyamine comprising a cyclic ring.

Aspect 7. The epoxide-functional adduct of any of the preceding Aspects, further comprising elastomeric particles dispersed in a composition comprising the epoxy-containing compound (E1).

Aspect 8. The epoxide-functional adduct of Aspect 7, wherein the elastomeric particles comprise a core-shell structure.

Aspect 9. An amine-functional adduct (A3) comprising a second reaction product of a reaction mixture comprising the epoxy-functional adduct (E2) of any of Aspects 1 to 8 and a monoamine, diamine, and/or polyamine (A2), wherein the monoamine, diamine, and/or polyamine (A2) are different than the diamine comprising the cyclic ring and/or the polyamine comprising the cyclic ring (A1).

Aspect 10. The amine-functional adduct of Aspect 9, wherein the monoamine, diamine, and/or polyamine (A2) comprises an aliphatic amine, polyether amine, araliphatic amine, and/or a cycloaliphatic amine.

Aspect 11. The amine-functional adduct of Aspect 9 or Aspect 10, wherein the adduct comprises a polyamine (A2) comprising ethylenediamine, bis(3-aminopropyl)diethylene glycol ether, bis(aminoethyl)ethylene glycol, or combinations thereof.

Aspect 12. The amine-functional adduct of any of Aspects 9 to 11, wherein the monoamine, diamine, or polyamine (A2) is present in an amount sufficient to provide a molar ratio of amine-hydrogens from the monoamine, diamine, or polyamine (2) to epoxide functional groups from the epoxide-functional adduct (E2) of at least 2:1.

Aspect 13. The amine-functional adduct of any of Aspects 9 to 12, further comprising elastomeric particles dispersed in the composition comprising the epoxy-functional adduct (E2).

Aspect 14. The amine-functional adduct of Aspect 13, wherein the elastomeric particles comprise a core-shell structure.

Aspect 15. A coating composition, comprising:

a first component comprising an epoxy-containing compound (E1); and a second component that chemically reacts with the epoxy-containing compound (E1), the second component comprising the amine-functional adduct (A3) of any of Aspects 9 to 14.

Aspect 16. A coating composition, comprising:

a first component comprising the epoxide-functional adduct (E2) of any of Aspects 1 to 8; and a second component that chemically reacts with the epoxide-functional adduct (E2), the second component comprising a monoamine, diamine, and/or polyamine (A2) and/or the amine-functional adduct (A3) of any of Aspects 9 to 14, wherein the diamine and/or polyamine (A2) is different than the diamine comprising the cyclic ring and/or the polyamine comprising the cyclic ring (A1).

Aspect 17. The coating composition of Aspect 15, wherein the epoxy-containing compound (E1) comprises bisphenol A, bisphenol F, a novolac resin, or combinations thereof.

Aspect 18. The coating composition of Aspect 15 or Aspect 16, wherein the amine-functional adduct (A3) is present in the coating composition in an amount sufficient to provide a ratio of epoxide functional groups from the epoxy-containing compound (E1) to amine-hydrogens from the amine-functional adduct (A3) of 0.5:1.0 to 1.5:1.0.

Aspect 19. The coating composition of Aspect 16, wherein the monoamine, diamine, and/or polyamine (A2) is present in the composition in an amount sufficient to provide a ratio of epoxide functional groups from the epoxide-functional adduct (E2) to amine-hydrogens from the mono-amine, diamine, and/or polyamine (A2) of 0.5:1.0 to 1.5:1.0.

Aspect 20. The coating composition of any of Aspects 15 to 19, further comprising elastomeric particles.

Aspect 21. The coating composition of Aspect 20, wherein the elastomeric particles comprise a core-shell structure.

Aspect 22. The coating composition of Aspect 20 or Aspect 21, wherein the elastomeric particles are present in the first component and are phase-separated from the epoxy-containing compound (E1) or the epoxy-functional adduct (E2).

Aspect 23. The coating composition of any of Aspects 20 to 22, wherein the elastomeric particles are present in the coating composition in an amount of 5 percent by weight to 45 percent by weight based on total weight of the coating composition.

Aspect 24. The coating composition of any of Aspects 15 to 23, further comprising an accelerator.

Aspect 25. The coating composition of Aspect 24, wherein the accelerator comprises a guanidine and/or a tris(aminomethylphenol).

Aspect 26. The coating composition of Aspect 24 or Aspect 25, wherein the accelerator is present in the coating composition in an amount of no more than 12 percent by weight based on total weight of the coating composition.

Aspect 27. The coating composition of any of Aspects 15 to 26, further comprising fillers in an amount of no more than 25 percent by weight based on total weight of the composition.

Aspect 28. The coating composition of any of Aspects 15 to 27, further comprising fillers in an amount of no more than 10 percent by weight based on total weight of the composition.

Aspect 29. The coating composition of any of Aspects 15 to 28, further comprising additives in an amount of no more than 25 percent by weight based on total weight of the coating composition.

Aspect 30. The coating composition of any of Aspects 15 to 29, wherein the coating composition is substantially free of platy fillers.

Aspect 31. The coating composition of any of Aspects 15 to 30, wherein the coating composition comprises an adhesive composition or a sealant composition.

Aspect 32. A substrate comprising a surface, at least a portion of which is coated with or embedded in the composition of any of Aspects 15 to 31.

Aspect 33. The substrate of Aspect 32, wherein the substrate comprises a fibrous material, a sheet, or a mesh.

Aspect 34. The substrate of Aspect 33, wherein the fibrous material, the sheet, or the mesh comprises a woven fibrous material, sheet, or mesh.

Aspect 35. The substrate of Aspect 33, wherein the fibrous material, the sheet, or the mesh comprises a non-woven fibrous material, sheet, or mesh.

Aspect 36. The substrate of any of Aspects 32 to 35, wherein the fibrous material, the sheet, or the mesh comprises carbon fibers, glass fibers, and/or nylon.

Aspect 37. The substrate of any of Aspects 32 to 36, positioned between a second substrate and a third substrate.

Aspect 38. Protective clothing comprising the substrate of any of Aspects 32 to 37.

Aspect 39. A part at least partially coated with the composition of any of Aspects 15 to 31.

Aspect 40. An article, comprising:

a first substrate;

a second substrate; and the composition of any of Aspects 15 to 31 positioned between the first and the second substrates.

Aspect 41. The article of Aspect 40, wherein one of the substrates comprises a ceramic and the other of the substrates comprises aluminum or a composite.

Aspect 42. The article of Aspect 40 or Aspect 41, wherein the composition, in an at least partially cured state, has a lap shear displacement of at least 2.5 mm at failure and a lap shear strength of at least 30.0 MPa, wherein the lap shear displacement and the lap shear strength are measured according to ASTM D1002-10 using 2024-T3 aluminum substrate of 1.6 mm thickness, as measured by an INSTRON 5567 machine in tensile mode with a pull rate of 1.3 mm per minute.

Aspect 43. A method for forming a coating on a surface of a substrate comprising: mixing the first component and the second component of any of Aspects 15 to 31 to form a mixture; and applying the mixture to at least a portion of the surface of a substrate.

Aspect 44. The method of Aspect 43, further comprising contacting a surface of a second substrate to the mixture such that the mixture is located between the substrate and the second substrate.

Aspect 45. The method of Aspect 43 or 44, further comprising at least partially curing the composition by exposing the composition to a temperature of at least 50° C.

Aspect 46. The method of Aspect 45, further comprising a second curing step comprising exposing the composition to a temperature of at least 120° C.

Aspect 47. A method of forming an article comprising extruding the composition of any of Aspects 15 to 31.

Aspect 48. The method of Aspect 47, wherein the extruding comprises three-dimensional printing.

Aspect 49. The method of Aspect 47 or Aspect 48, further comprising, before extruding, mixing the first component and the second component.

Aspect 50. The method of any of Aspects 47 to 49, wherein the extruding comprises applying successive layers to build the article.

Aspect 51. The article formed by the method of any of Aspects 47 to 50.

Aspect 52. Use of the coating composition according to any one of Aspects 15 to 30 for coating a surface of a substrate and/or the substrate is coated by a method for treating a substrate as described in any one of Aspects 43 to 46.

Aspect 53. Use of the coating composition according to any one of Aspects 15 to 30 for forming an article and/or the article is formed by a method as described in any one of Aspects 47 to 50.

Illustrating the invention are the following examples which, however, are not to be considered as limiting the invention to their details. Unless otherwise indicated, all parts and percentages in the following examples and throughout the specification are by weight.

EXAMPLES

Example 1

A deoxidizing composition (DEOX-1) was prepared in a clean 5-gallon plastic bucket to which 18.2 liters of deionized water, 180.5 g fluorosilicic acid (23% solution), 80 g fluorozirconic acid (45% solution), 11.61 g potassium bifluoride, and 31.6 g of Chemfil Buffer (commercially available from PPG Industries, Inc.) were added.

Lap shear specimens were prepared using Compositions I through XXI below according to ASTM D1002-10. The substrate used was 2024-T3 aluminum alloy panels measuring 25.4 mm×101.6 mm×1.6 mm. The panels were cleaned with acetone and treated with DEOX-1. Composition was applied to one end of a panel covering the full 25.4 mm width and ≥12.7 mm from one end. A second pretreated aluminum panel was then placed over the composition layer in an end-to-end fashion, resulting in a bond area of 25.4 mm×12.7 mm. Lap joints were secured with metal clips and excess composition cleaned, leaving a 45° fillet. The baked lap joint specimens were tested using an INSTRON model 5567 in tensile mode with 25.4 mm of aluminum substrate in each grip and at a pull rate of 1.3 mm per minute (in accordance with ASTM D1002-10). The cured lap joint specimens were tested using an INSTRON model 5567 in tensile mode with 25.4 mm of aluminum substrate in each grip and at a pull rate of 1.3 mm per minute (in accordance with ASTM D1002-10).

TABLE 1

| Composition I | |
|---|---|
| Component | I (E2) |
| Epon 863[1] | 483.75 |
| m-xylylenediamine[2] | 16.25 |
| Total | 500 |
| E:AH ratio | 6:1 |
| Theoretical epoxy equivalent weight of reaction product | 209.63 |

[1]Bisphenol F epoxy resin available from Hexion

[2]Diamine containing a cyclic ring (A1), available from Sigma Aldrich

Composition I of Table 1 was prepared by adding m-xylylenediamine to the Bisphenol F epoxy at a molar ratio of epoxide functional groups from the epoxy-containing compound to amine-hydrogens from the diamine or polyamine containing a cyclic ring (E:AH) of 6:1. The m-xylylenediamine was added to the epoxy resin drop-wise at 70° C. yielding a reaction product with a theoretical epoxy equivalent weight of 209.6 grams per epoxide.

TABLE 2

| Compositions II-X (A3 Compositions) | | | | | | | | | |
|---|---|---|---|---|---|---|---|---|---|
| Component | II | III | IV | V | VI | VII | VIII | IX | X |
| Composition I | 18.08 | 20.73 | 24.29 | 18.52 | 21.62 | 13.78 | 16.12 | 19.40 | 14.58 |
| Jeffamine EDR-148 [1] | 31.92 | 29.27 | 25.71 | 29.90 | 25.55 | | | | |
| Ancamine 1922A[2] | | | | | | 36.22 | 33.88 | 30.60 | 33.64 |
| Dyhard 100SF[3] | | | | 1.58 | 2.83 | | | | 1.78 |
| Total | 50.00 | 50.00 | 50.00 | 50.00 | 50.00 | 50.00 | 50.00 | 50.00 | 50.00 |
| E:AH (including amines from the dicyandiamide) | 1:10 | 1:8 | 1:6 | 1:10 | 1:8 | 1:10 | 1:8 | 1:6 | 1:10 |
| Theoretical amine-hydrogen equivalent weight of reaction product | 64.4 | 72.2 | 86.4 | 62.9 | 69.2 | 84.5 | 92.9 | 108.0 | 79.9 |

[1] Bis(aminoethyl)ethylene glycol, available from Huntsman

[2]Bis(3-aminopropyl)diethylene glycol ether, available from Evonik

[3]Dicyandiaminde available from AlzChem

The epoxy-functional reaction product formed in Table 1 (Composition I, E2) was then added dropwise at 70° C. to the components (A2) listed in Table 2 above at various amine-hydrogen to epoxide ratios, yielding amine functional adducts (A3) with the theoretical amine-hydrogen equivalent weights listed in Table 2 above.

TABLE 3

| Compositions XI-XXI | | | | | | | | | | | |
|---|---|---|---|---|---|---|---|---|---|---|---|
| Component | XI | XII | XIII | XIV | XV | XVI | XVII | XVIII | XIX | XX | XXI |
| Epon 863 | 2.12 | 1.65 | 0.90 | 2.22 | 1.85 | 1.00 | 0.55 | 0 | 1.25 | 2.75 | 4.10 |
| Kane Ace MX-135[1] | 16.00 | 16.00 | 16.00 | 16.00 | 16.00 | 16.00 | 16.00 | 16.00 | 16.00 | 16.00 | 16.00 |
| Composition II | 5.63 | | | | | | | | | | |
| Composition III | | 6.10 | | | | | | | | | |
| Composition IV | | | 6.85 | | | | | | | | |
| Composition V | | | | 5.53 | | | | | | | |
| Composition VI | | | | | 5.90 | | | | | | |
| Composition VII | | | | | | 6.75 | | | | | |
| Composition VIII | | | | | | | 7.20 | | | | |

TABLE 3-continued

| Compositions XI-XXI | | | | | | | | | | | |
|---|---|---|---|---|---|---|---|---|---|---|---|
| Component | XI | XII | XIII | XIV | XV | XVI | XVII | XVIII | XIX | XX | XXI |
| Composition IX | | | | | | | | 8.00 | | | |
| Composition X | | | | | | | | | 6.50 | | |
| Jeffamine EDR-148 | | | | | | | | | | 5.00 | |
| Ancamine 1922A | | | | | | | | | | | 3.65 |
| Ancamine K-54[2] | 0.50 | 0.50 | 0.50 | 0.50 | 0.50 | 0.50 | 0.50 | 0.50 | 0.50 | 0.50 | 0.50 |
| Total | 25.00 | 25.00 | 25.00 | 25.00 | 25.00 | 25.00 | 25.00 | 25.25 | 25.00 | 25.00 | 25.00 |
| Lap Shear Strength (70° C., 1 hr cure) [MPa] | 38 | 37 | 39 | 41 | 42 | 34 | 34 | 34 | 36 | 24 | 29 |
| Disp. at Failure (70° C., 1 hr cure) [mm] | 2.2 | 2.2 | 2.4 | 2.5 | 2.7 | 2.0 | 2.0 | 1.9 | 2.2 | 1.3 | 1.6 |
| Lap Shear Strength (Ambient cure, 7 days) [MPa] | 32 | 34 | 34 | 33 | 35 | 31 | 30 | 30 | 32 | 11 | 20 |
| Disp. at Failure (Ambient cure, 7 days) [mm] | 2.0 | 2.1 | 2.1 | 2.1 | 2.3 | 2.1 | 1.8 | 1.8 | 1.9 | 0.6 | 1.1 |

[1]Blend of bisphenol F epoxy resin and ~100 nm diameter core-shell styrene-butadiene rubber available from Kaneka Corporation
[2]2,4,6-tris(N,N-dimethylaminomethyl)phenol available from Evonik[6]Ancamine K-54 available from Evonik Compositions II-X (A3) were then utilized in the two-component adhesive formulations in Table 3. The epoxy-functional resins were premixed using a DAC Speed-Mixer®, then the amine-functional components, accelerators, and 10 mil spacer beads at 2% by weight were added and mixed for 2 minutes at 2350 RPM using a DAC SpeedMixer®. Lap shear specimens were prepared immediately using compositions XI-XXI above. Lap shear strength and displacement are presented in Table 3 following a one hour cure at 70° C. or a 7 day cure under ambient conditions. Lap shear results demonstrate the improved strength and displacement in compositions comprising an epoxy-containing component (E1) and an amine functional adduct (A3).

Example 2

Compositions XXII and XXIII were prepared from the mixtures of ingredients shown in Table 4. The compositions were prepared at an E:AH molar ratio of 6:1 and 8:1 with the amine side added to the epoxy drop-wise at 70° C.

TABLE 4

| Compositions XXII-XXIII | | |
|---|---|---|
| Components | XXII | XXIII |
| Kane Ace MX-135 | 25 | 25 |
| Epon 863 | 25 | 25 |
| m-xylylenediamine | 1.46 | 1.11 |
| Total | 51.46 | 51.11 |

Compositions XXII and XXIII were then utilized in the two-component adhesive formulations in Table 5. For Compositions XXIV-XXV, the epoxy-functional resins were premixed using a SpeedMixer®, then the amine-functional components, accelerators, and 4.1 mil spacer beads at 2% by weight were added and mixed for 2 minutes at 2350 RPM using a SpeedMixer®. In composition XXIV and XXV the Dyhard 100SF was first dissolved in the liquid diamine before blending with the epoxy component. Lap shear specimens were prepared immediately using Compositions XXIV-XXV, as described in Example 1. Lap joints were tested for lap shear strength and displacement as described in Example 1. Lap shear strength and displacement are presented in Table 5 following a one hour cure at 70° C. or a 7 day cure under ambient conditions.

TABLE 5

| Compositions XXIV-XXV | | |
|---|---|---|
| Components | XXIV | XXV |
| Composition XXII (E:AH molar ratio, 6:1) | 19.85 | |
| Composition XXIII (E:AH molar ratio, 8:1) | | 20.82 |
| Ancamine 1922A | 3.46 | 3.62 |
| Dy hard 100SF | 0.69 | 0.73 |
| Ancamine K-54 | 0.50 | 0.50 |
| Total | 24.5 | 24.5 |
| Lap Joint Performance | | |
| Lap Shear Strength (70° C. cure) [MPa] | 45.6 ± 0.8 | 40.0 ± 3.8 |
| Displacement at Failure (70° C. cure) [mm] | 3.52 ± 0.08 | 2.63 ± 0.40 |
| Lap Shear Strength (Ambient Cure) [MPa] | 26.1 ± 3.3 | 28.1 ± 1.8 |
| Displacement at Failure (Ambient Cure) [mm] | 1.68 ± 0.18 | 1.75 ± 0.09 |

The results indicate that by reacting the epoxy component (E1) with m-xylylenediamine (A1) to yield E2 and completing the cure with the aliphatic Ancamine 1922A (A2) gives outstanding lap shear strength and displacement.

Example 3

TABLE 6

| Compositions XXVI-XXVII | | |
|---|---|---|
| Components | XXVI | XXVII (Comp) |
| Epon 863 | 120.9 | 46.8 |
| m-xylylenediamine | 4.1 | |
| Jeffamine EDR-148 | 133 | 53.4 |
| Theoretical Amine Hydrogen Equivalent Weight of Reaction Product | 86.0 | 87.4 |

Synthesis of Composition XXVI: To a round bottom flask equipped with a nitrogen inlet and addition funnel was added Epon 863 (120.9 g, 2.86 eq.) and blanketed with nitrogen. Via the addition funnel, m-xylylenediamine (MXDA, 4.1 g, 0.48 eq.) was added dropwise over 30 minutes, resulting in exotherm of the reaction mixture to ca. 80° C. The resulting mixture was held at 70° C. for ca. 8 h, at which time TLC showed complete consumption of the MXDA. In a separate flask, Jeffamine EDR-148 (133.0 g, 14.4 eq.) was blanketed with nitrogen, and the MXDA-Epon 863 reaction product was slowly dispersed into the Jeffamine EDR-148, resulting in exotherm of the reaction mixture to ca. 125° C. The resulting mixture was allowed to cool for 72 h, then was heated to 70° C. ca. 8 h, at which time TLC indicated complete consumption of the MXDA-Epon 863 reaction product. The reaction product was poured into a suitable container for storage.

Synthesis of Composition XXVII: To a round bottom flask equipped with a nitrogen inlet and addition funnel was added Jeffamine EDR-148 (53.4 g, 1.44 eq.). Via the addition funnel, Epon 863 (46.8 g, 0.28 eq.) was added dropwise over 1 hour. The resulting mixture was held at 70° C. for a total of ca. 8 h, at which time TLC indicated consumption of the Epon 863. The reaction product was poured into a suitable container for storage.

Compositions XXVI and XXVII were then utilized in the two-component adhesive formulations in Table 7. For Compositions XXVIII-XXIX, the epoxy-functional resins and filler were premixed using a SpeedMixer®, then the amine-functional components, accelerators, and 10 mil spacer beads at 2% by weight were added and mixed for 2 minutes at 2350 RPM using a SpeedMixer®. Lap shear specimens were prepared immediately, as described in Example 1. Lap joints were tested for lap shear strength and displacement as described in Example 1. Lap shear strength and displacement are presented in Table 7 following a one hour cure at 70° C.

TABLE 7

| Compositions XXVIII-XXIX | | |
|---|---|---|
| Components | XXVIII | XXIX (Comp) |
| Kane-Ace MX-135 | 16.00 | 16.00 |
| Epon 863 | 0.83 | 0.75 |
| Aerosil R202[1] | 0.50 | 0.50 |
| Composition XXVI | 6.67 | |
| Composition XXVII | | 6.75 |
| Ancamine K-54 | 0.50 | 0.50 |
| Lap Joint Performance | | |
| Lap Shear Strength (70° C. cure) [MPa] | 41.9 ± 1.1 | 40.4 ± 1.3 |
| Displacement at Failure (70° C. cure) [mm] | 2.6 ± 0.2 | 2.3 ± 0.1 |

[1]Hydrophobic fumed silica available from Evonik

The results indicate that by reacting the epoxy component (E1) with m-xylylenediamine (A1) to yield E2 and completing the cure with the aliphatic Ancamine 1922A (A2) gives improved lap shear strength and displacement over samples prepared without a cyclic containing amine A1.

Example 4

Lap joint specimens (prepared according to ASTM D1002-10 as described above) were prepared using Loctite EA 9309, Loctite EA 9320, or Loctite EA 9395 (each commercially available from Henkel), DP460NS (commercially available from 3M), and with Composition II (prepared as described above) under identical conditions. In order to maintain a bondline thickness, 4.1 mil glass beads were added to each composition at 2% by weight based on total weight of the composition. Lap joint specimens were baked at 70° C. for 60 minutes. Testing was conducted according to ASTM D1002-10.

TABLE 5

| | Lap Joint Performance | | | | |
|---|---|---|---|---|---|
| Composition | Loctite EA9309 (comparative) | Loctite EA9320 (comparative) | Loctite EA9395 (comparative) | DP460NS (comparative) | XXIV |
| Lap Shear Strength [MPa] | 33.0 ± 0.8 | 36.1 ± 3.2 | 27.4 ± 2.2 | 36.4 ± 0.7 | 45.6 ± 0.8 |
| Displacement at Failure [mm] | 2.10 ± 0.05 | 2.31 ± 0.19 | 1.73 ± 0.13 | 1.80 ± 0.05 | 3.52 ± 0.08 |

The results indicate the outstanding combination of lap shear strength and displacement of compositions based on an epoxy-functional adduct E2 and an amine curing agent A2 compared to commercial adhesive compositions.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:

1. An amine-functional adduct (A3) comprising:

a second reaction product of reactants comprising:

(i) an epoxide-functional adduct (E2); and (ii) a first diamine (A2), wherein the epoxide-functional adduct (E2) comprises a first reaction product of reactants comprising:

(a) an epoxy-containing compound (E1) comprising a bisphenol A, bisphenol F, and/or novolac resin; and (b) an aromatic diamine (A1), wherein the aromatic diamine (A1) is present in an amount sufficient to provide a molar ratio of epoxide groups from the epoxy-containing compound (E1) to amine-hydrogens from the aromatic diamine (A1) of at least 4:1 to no more than 11:1, and wherein the first diamine (A2) is different than the aromatic diamine (A1).

2. The amine-functional adduct of claim 1, wherein a ratio of amine hydrogens from the first diamine (A2) to epoxide functional groups from the epoxide-functional adduct (E2) is at least 2:1.

3. The amine-functional adduct of claim 1, wherein the epoxide-functional adduct (E2) further comprises elastomeric particles.

4. A coating composition, comprising:

a first component comprising a second epoxy-containing compound; and a second component that chemically reacts with the second epoxy-containing compound, the second component comprising the amine-functional adduct (A3) of claim 1.

5. The coating composition of claim 4, wherein the amine-functional adduct (A3) is present in the composition in an amount sufficient to provide a molar ratio of epoxide functional groups from the epoxy-containing compound (E1) to amine-hydrogens from the amine-functional adduct (A3) of 0.5:1.0 to 1.5:1.0.

6. The coating composition of claim 4, further comprising elastomeric particles, an accelerator, an additive and/or a filler.

7. A method of forming an article comprising extruding the composition of claim 4.

8. The article formed by the method of claim 7.

9. A substrate comprising a surface, at least a portion of which is coated with or embedded in the composition of claim 4.

10. Protective clothing comprising the substrate of claim 9.

11. An article, comprising:

a first substrate;

a second substrate; and the composition of claim 4 positioned between the first and the second substrates.

* * * * *